United States Patent

[11] 3,589,483

| [72] | Inventor | Paul J. Smith |
| | | Toledo, Ohio |
| [21] | Appl. No. | 6,101 |
| [22] | Filed | Jan. 27, 1970 |
| [45] | Patented | June 29, 1971 |
| [73] | Assignee | Dana Corporation |
| | | Toledo, Ohio |

[54] VARIABLE SPEED TRANSMISSION
26 Claims, 11 Drawing Figs.

[52] U.S. Cl.................................................. 192/3.52,
74/331, 74/868
[51] Int. Cl..................................................F16d 67/00,
F16h 3/08, B60k 23/00
[50] Field of Search............................................ 74/331;
192/351, 352, 357

[56] References Cited
UNITED STATES PATENTS

| 2,333,037 | 10/1943 | Osborn......................... | 74/330 |
| 2,507,051 | 5/1950 | Roberts......................... | 192/3.52 |
| 2,962,915 | 12/1960 | Wiggerman.................. | 74/687 |
| 2,972,899 | 2/1961 | Wiggerman.................. | 74/331 X |
| 3,191,731 | 6/1965 | Whateley...................... | 192/3.52 |
| 3,362,245 | 1/1968 | Franchuch et al............ | 74/368 X |
| 3,438,469 | 4/1969 | Hilpert......................... | 192/3.57 |

Primary Examiner—Arthur T. McKeon
Attorneys—Walter E. Pavlick, Harold D. Shall and John F. Teigland ABSTRACT: A transmission having an elongated input shaft with a plurality of input gears unitarily rotatable therewith, and having a pair of countershafts, with each countershaft having a free running gear thereon, and with each countershaft gear meshing with an input gear. A planetary gearset is connected to receive power from the countershafts and provide a collected common output. An input member includes a pair of friction clutches, one clutch for connecting the input member to the input shaft, and the other clutch for connecting the input member to a through shaft which is connected to the common output. The countershaft carries gear clutches for selectively connecting the countershaft gears thereto, and a braking arrangement is provided to hold the ring gear of the planetary gearset stationary. A semiautomatic control system controls the operation of the various clutches and the braking arrangement to shift the transmission.

INVENTOR.
PAUL J. SMITH
BY Harold D. Shall
ATTORNEY

INVENTOR.
PAUL J. SMITH

INVENTOR.
PAUL J. SMITH

INVENTOR.
PAUL J. SMITH

BY Harold D. Shall

ATTORNEY

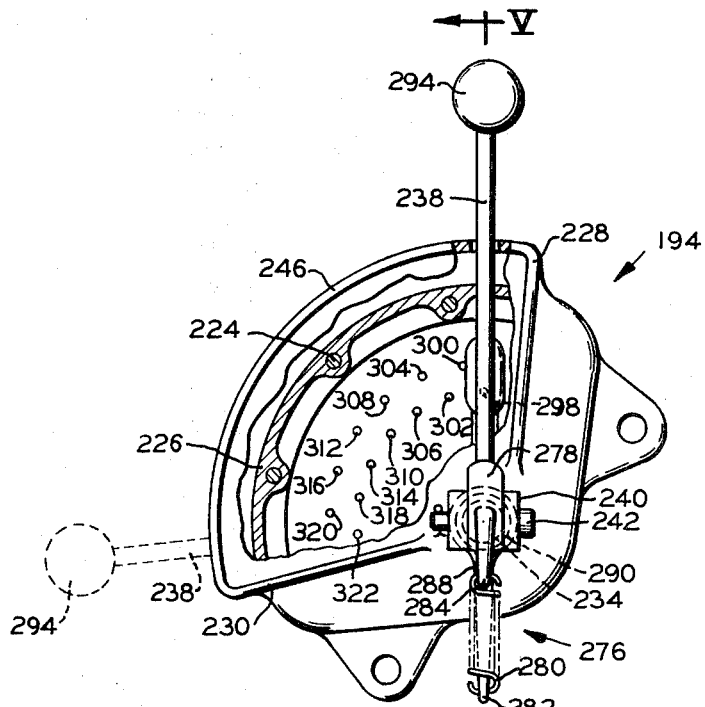
FIG. 4
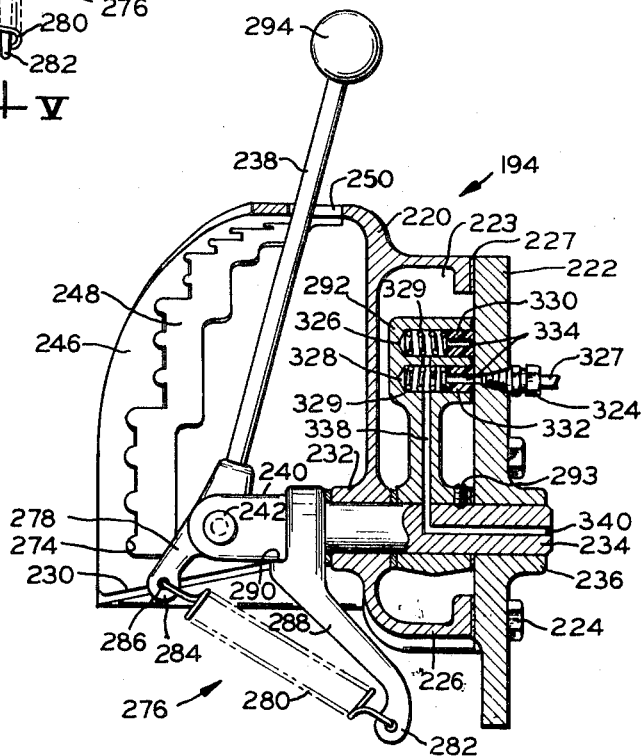
FIG. 5
FIG. 6
INVENTOR.
PAUL J. SMITH
BY
Harold D. Hall
ATTORNEY

VARIABLE SPEED TRANSMISSION

In a simple, prior art transmission, a separate pair of change speed gears is provided for each gear ratio. This results in a great number of pairs of gears where a plurality of ratios is desired and requires that the various pairs of gears be capable of withstanding the full torsional load being transmitted by the transmission in that particular ratio. Where the load is large, these gears become quite massive in size and expensive.

In order to reduce the size and the number of gears of a transmission, there has been provided a main transmission and an auxiliary transmission, either in the same or separate housings. The auxiliary transmission splits or compounds the ratios in the main transmission, so that the number of pairs of gears is somewhat reduced in a well-known manner. However, such a device still requires that the gears transmit the full torsional load in a particular ratio. Further, in shifting such a device, certain of the changes between the various gear ratios require what is commonly referred to as a "double swap," that is, the shifting or transition between two pairs of gears in the main transmission and between two pairs of gears in the auxiliary transmission to accomplish a single drive ratio change. The disengaging of one pair of gears and the engagement of another pair of gears to provide a single drive ratio change is referred to as a "single swap."

Certain prior transmissions have been provided with arrangements wherein the selected pair of ratio gears do not have to carry the full load being transmitted by the transmission in that ratio. One such device is shown in U.S. Pat. No. 3,105,395 wherein a pair of equally loaded countershafts is utilized with a separate gear on each countershaft connecting the same to a gear on the output shaft for each speed ratio, so that each countershaft gear transmits only half the load. However, both countershafts must rotate at the same speed and, where a plurality of ratios is desired in such a transmission, either an undesirably great number of speed ratio gears must be provided or a main and auxiliary transmission combination utilized; the latter requiring double swaps as previously described.

Other prior art devices have attempted to reduce the load carrying requirements of the speed ratio gears in another manner. One such device is shown in U.S. Pat. No. 3,082,646 wherein the torque from a common input member is directed separately to a pair of change speed groups, each group having its own input shaft and output shaft and change speed gears therebetween. The torque output from the pair of groups is directed into a differential unit from which a collected torque output is available from a common output member. While solving certain problems, this device is disadvantageous in that each of the separate change speed groups is in itself a separate transmission, so that the torque output of two separate transmissions is being collected. Thus, although the two change speed gear groups have a common input and a common output, the two groups are not otherwise structurally or functionally related. Further, there is no provision for bypassing the separate gear groups and obtaining a direct drive between the common input member and common output member. With the differential unit shown the only overdrive and reduction ratios available in the unit itself are 1:2 and 2:1, respectively.

The above device is very similar to the arrangement in U.S. Pat. No. 2,981,126, wherein a planetary input means supplies torque differentially to a pair of automatic transmissions each including change speed groups, with the output shafts from the two transmissions being joined to a single output means which receives the torsional loads from both transmissions. No direct drive arrangement from input to output means is available. Further, if the planetary unit is utilized to obtain a reduction ratio drive, the torque multiplication of the reduction ratio must be accommodated by the parallel transmissions. In contrast, if the planetary were used as a collection device between the transmissions and the common output, the subsequent reduction ratio of the planetary would lessen the torsional load carried by the transmission components.

In double countershaft devices, wherein each pair of change speed gears is provided with mechanical clutching devices for connecting the same in a driving relationship between the countershaft and output shaft, a separate synchronizing clutch means is supplied for each pair of gears or the transmission is unsynchronized. The former requires a multitude of clutches while the latter presents the well-known problems of shifting an unsynchronized transmission.

It is an object of this invention to provide a variable speed transmission wherein individual gears of the various power paths of the transmission are subjected to a reduced torsional load in most speeds.

Another object of this invention is to provide a variable speed transmission having a plurality of power paths therethrough wherein various change speed gears of the power paths form a part of more than one power path.

It is a further object to provide a transmission as described immediately above wherein the various change speed gears may be engaged to select a great number of different power paths without requiring a double swap shift.

It is another object of this invention to provide a transmission having a pair of countershafts therein wherein a single means is operative for synchronizing the upshifting of all the change speed gearing thereof.

Still a further object of this invention is to provide a variable speed transmission wherein the individual gears of the various power paths of the transmission are subjected to a reduced torsional load and the various change speed gears may be engaged by shifts of the single swap type to provide a greater number of ratios.

It is yet another object of this invention to provide a transmission having an input shaft and pairs of simultaneously operating change speed groups from which an output is collected on a single output means in order to provide at least some of the ratios between the input and output of the transmission.

A further object of this invention is to provide a transmission as described immediately above wherein the output from one of the change speed groups may be held as a stationary reaction means for the output of the other change speed group in order to provide additional ratios between the input and output of the transmission.

Yet a further object of this invention is to provide a variable speed transmission wherein the output may be driven from the input by a pair of collected power paths or may be directly driven in a direct drive ratio.

Yet another object of this invention is to provide a transmission wherein the input and output may be frictionally connected in a direct drive relationship for providing for a direct transfer of torque therebetween during direct drive and for frictionally synchronizing the speeds of the input shaft and input shaft driven portions to the speed of the output shaft and the output shaft driven portions during the shifting of the various change speed gears of the transmission.

Still a further object of this invention is the provision of a novel pneumatic and hydraulic control system particularly useful in combination with the novel transmission shown herein.

An additional object of this invention is the provision of a novel pneumatic and hydraulic control system which enables upshifting and downshifting of the transmission and aids in the synchronization thereof during shifting.

Other objects, advantages and features of this invention will become apparent when the detailed description thereof is taken in conjunction with the following drawings, in which:

FIG. 4 is a side elevational view, partially in section, of a thirteen position selection valve utilized in this invention;

FIG. 5 is a cross-sectional view taken along lines V-V of the apparatus of FIG. 4;

FIG. 6 is a layout of the shift pattern of the apparatus of FIG. 5 as viewed from above with the arc-shaped shift plate flattened out for clarity;

In a preferred embodiment of this invention the various components of the transmission are disposed within a housing and include an elongated input shaft, forming a part of the input means, and an output shaft disposed coaxially therewith and rotatable relative thereto and a pair of intermediate or countershafts disposed in parallel spaced relation with the input shaft. The input shaft has a plurality of spaced relation with the input shaft. The input shaft has a plurality of spaced change speed gears disposed along its length and unitarily rotatable therewith. A plurality of change speed gears are rotatably disposed on each of the countershafts with corresponding and opposed gears on each countershaft each engaging one of the gears on said input shaft. A planetary gearset is disposed coaxially with the input shaft with the sun gear thereof connected to receive the output of one countershaft, and the ring gear thereof connected to receive the output of the other countershaft. The planetary gear carrier is connected to drive the output shaft.

The arrangement is such that any one of the change speed gears on one of the countershafts may be connected to drive that countershaft simultaneously with the connection of any one of the change speed gears on the other countershaft to drive the other countershaft. The ring gear and sun gear of the planetary gearset may each be driven in a selected one of a number of different speed relationships. The planet gear carrier and the output shaft connected thereto are thus driven in one of a number of selectable ratios with respect to the input shaft.

Means are also provided for reversing the input of one of the countershafts to the planetary gearset for providing reverse operation of the output shaft. Additionally, means are provided for maintaining a portion of the planetary gearset stationary to provide for additional ratios between the input and output shafts.

A clutch means, including a direct drive clutch and an input shaft clutch, may be operated to directly connect the input means and the output shaft in a direct drive relationship. In the preferred embodiment, the clutch means may also be operated to synchronize the speeds of the upshifting and downshifting countershaft gears to that of the countershaft so that the selected gears may be rapidly and easily engaged.

A pneumatically and hydraulically actuated integrated control system is also provided so that the transmission may be conveniently upshifted and downshifted and synchronized for these shifts.

Figure 1:
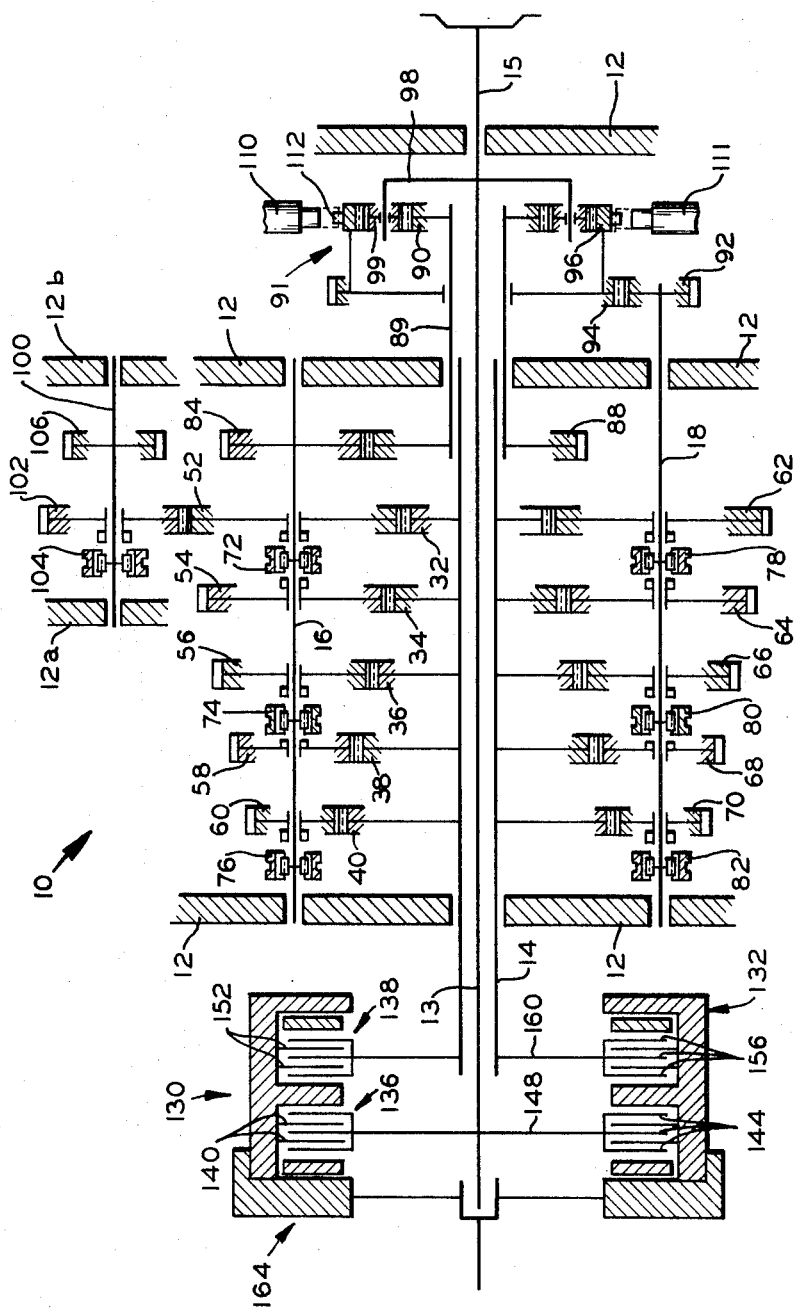
FIG. 1 is a diagrammatic view of a variable speed transmission embodying this invention with some of the parts thereof displaced from their true position so that the structural relationship thereof is more apparent.

Referring now specifically to FIG. 1, there is shown a transmission generally indicated at 10 constructed according to the principles of the invention. The transmission 10 includes a housing 12 in which is disposed an input shaft 14, a through or output shaft 13 terminating in an output spindle 15 and a pair of countershafts 16 and 18.

Figure 2:
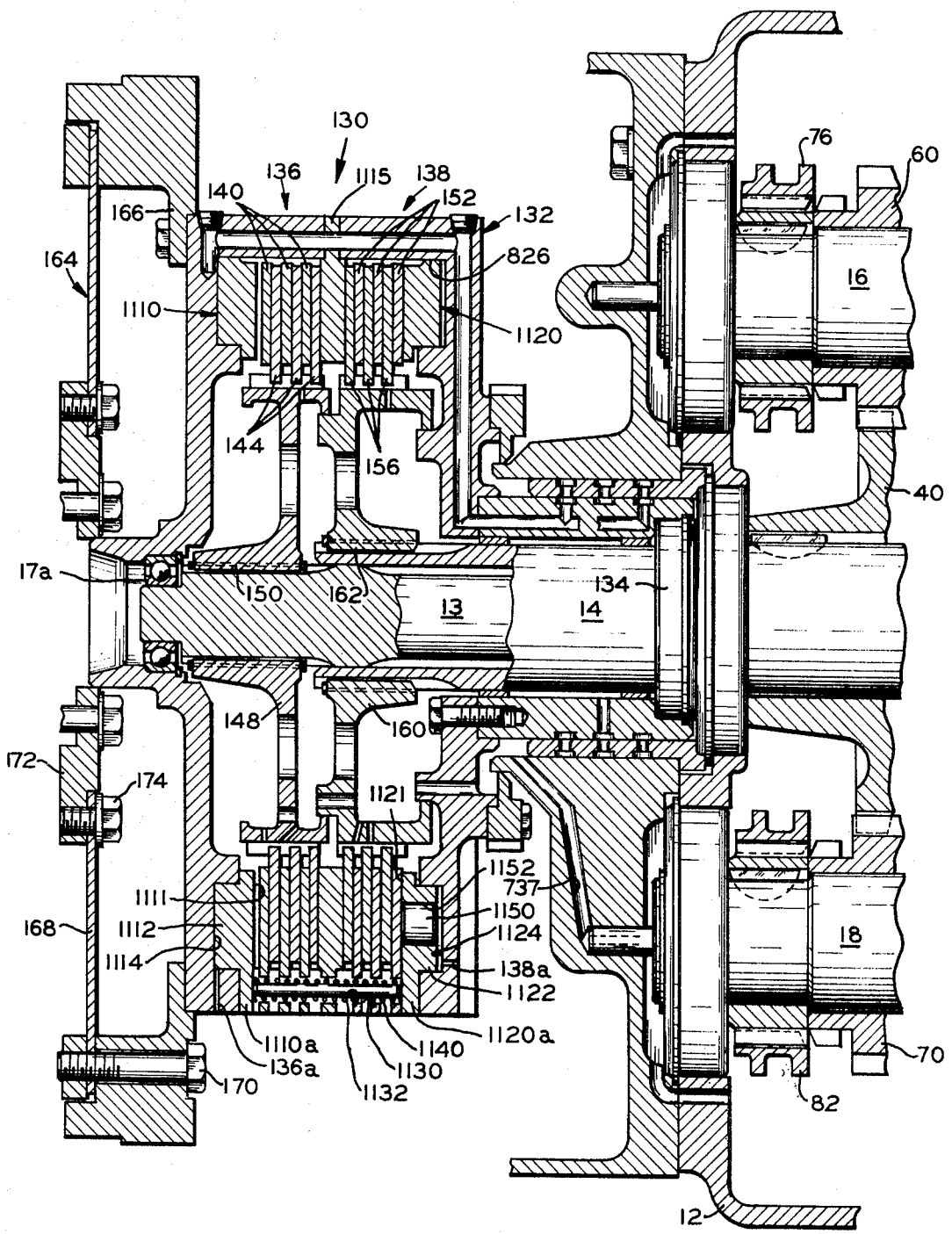
FIG. 2 is a cross-sectional view of the main clutch means of the transmission shown in FIG. 1.

The through shaft 13 is rotatably supported at its left end as viewed in FIGS. 1 and 2 by bearing means disposed in a bore in a clutch housing 132, which in turn is carried by a flywheel 164 connected to the output shaft of an engine. Shaft 13 extends rightwardly to be attached to the output spindle 15 and the assembly thereof comprises the output means for the transmission. The output spindle 15 is splined or otherwise connected to through shaft 13 and the former is rotatably disposed in the housing by a bearing means fitted conveniently in the housing 12. The bearing supports discussed herein for the various shafts are well known in the art and will not be shown in the drawings or discussed in detail herein.

Each of the countershafts 16 and 18 are supported by a pair of bearing means suitably disposed in portions of the housing 12. The input shaft 14, which is hollow and coaxial with the through shaft 13, may be supported by suitably located bearing means. It can thus be seen that the through shaft, input shaft and countershafts are conveniently mounted for rotation within the housing 12.

The input shaft 14 has a plurality of change speed gears mounted or formed thereon for unitary rotation comprising change speed gears 32, 34, 36, 38 and 40.

A series of countershaft gears 52, 54, 56, 58 and 60 are rotatingly mounted on countershaft 16 while being secured against axial movement relative thereto and are in mesh with and driven, respectively, by the change speed gears 32, 34, 36, 38 and 40 on the input shaft 14. Countershaft 18 has a series of gears 62, 64, 66, 68 and 70 rotatingly mounted thereon and secured against relative axial movement and also meshing with and being driven by the change speed gears 32, 34, 36, 38 and 40, respectively.

A series of toothed clutch means are provided on the countershaft 16 to selectively secure the gears rotating thereon to the shaft 16 to cause rotation of shaft 16 in response to rotation of input shaft 14. A toothed clutch means 72 is disposed between gears 52 and 54 and secured against rotation on the shaft 16. Upon axial movement of a portion of the clutch means 72 in a rightward or leftward direction, such will engage cooperative clutch teeth on the gear 52 or on the gear 54, respectively, and thereby drivingly connect the engaged gear to the countershaft 16. A toothed clutch means 74 is mounted on the input shaft 16 and secured against rotation on the shaft 16 between the gears 56 and 58 and adapted to cooperate with clutch teeth on each of these gears. Rightward and leftward movement of a portion of the clutch means 74 will connect gear 56 and the gear 58, respectively, to the countershaft 16. A toothed clutch means 76 is also mounted on countershaft 16 between the housing 12 and the gear 60 and secured to the countershaft 16. Upon movement of a portion of the clutch means 76 in a rightward direction it will engage cooperative clutch teeth on the gear 60 and drivingly connect the latter to countershaft 16.

A series of toothed clutch means are also provided on the countershaft 18 to engage cooperating clutch teeth of the countershaft gears thereon and thereby drivingly connect the gear to the shaft 18. A toothed clutch means 78 is disposed between gears 62 and 64 and secured to the countershaft 18. Movement rightwardly or leftwardly of a portion of the clutch means 78 connects either the gear 62 or gear 64 to the countershaft 18. A toothed clutch means 80 is disposed between the gears 66 and 68 and secured to the countershaft 18. Axial movement of a portion of the clutch means 80 will connect either gear 66 or 68 to the shaft 18. A toothed clutch means 82 is disposed between the housing 12 and gear 70 and secured to the countershaft 18. Rightward axial movement of a portion of the clutch means 82 connects the gear 70 for rotation with the countershaft 18. It can be seen from the foregoing description that the countershafts 16 and 18 may simultaneously be driven at a plurality of speeds dependent upon which of the various change speed gears on input shaft 14 is drivingly engaged through the toothed clutches with the countershafts 16 and 18.

Means are provided for driving a planetary gear means 91 from the countershafts 16 and 18. A driving gear 84 is fixed to rotate unitarily with the countershaft 16 by a key or other means connecting the driving gear 84 and countershaft 16. The gear 84 meshes with a gear 88 which has an elongated rightwardly extending hub 89 carrying sun gear 90. The hub 89 is mounted for rotational movement in the housing 12 and for rotational movement about the through shaft 13 to drive the sun gear 90 of the planetary gear means 91. Sun gear 90 is spaced from and rotatable about the through shaft 13.

A drive gear 92 is formed as a part of or mounted for unitary rotation with the countershaft 18. The drive gear 92 meshes with a gear 94 which is an extension of a ring gear 96 of the planetary gear means 91. The ring gear 96 is disposed coaxially with the through shaft 13 and sun gear 90. A planetary carrier 98 of the planetary gear means 91 is splined or otherwise fixed to the through shaft 13 and is disposed between the ring gear 96 and sun gear 90 in a conventional planetary arrangement. Rotation of the ring gear 96 and sun gear 90 by rotation of countershafts 16 and 18, respectively, provides an output through planet gears 99 and carrier 98 to the through shaft 13 and the output spindle 15.

Means are provided to place the transmission 10 in reverse which comprises a reverse shaft 100 that is rotatably mounted relative to the housing 12 by bearing means in supporting portions 12a and 12b of the housing 12 which have been displaced from their normal positions to show an operable gear mesh in FIG. 1. A reverse gear 102 is rotatably mounted on the reverse shaft 100 so as to be in constant driving engagement with the gear 52 on countershaft 16. The gear 52, during reverse operation, is not clutched to the shaft 16 by clutch means 72 and is driven by gear 32 on input shaft 14. The gear 102 is mounted to be selectively connected to shaft 100 by a toothed clutch means 104 mounted on the shaft 100 for unitary rotation and having splined sections for limited axial movement to the right from the position shown in FIG. 1. A reverse drive gear 106 mounted for unitary rotation with reverse shaft 100 meshes with the sun gear extension 88 and drives it in a direction which is reverse from the direction it would be driven in by the gear 84 when in forward drive. During reverse drive, the ring gear 96 is held stationary by holding means, described hereinafter, and serves as a reaction means so that the planet carrier is driven in the reverse direction solely by the sun gear 90. Further, all the toothed clutch means 78, 80 and 82 on the shaft 18 and toothed clutch means 72, 74 and 76 on shaft 16 are disengaged at this time. Thus, the transmission 10 may be selectively placed in reverse drive by the engagement of reverse clutch means 104.

Means are provided to hold the ring gear 96 stationary for reverse operation and also to provide certain of the gear ratios for the transmission 10. This means includes a pair of oppositely disposed and pneumatically operated plungers 110 and 111, positioned at the right end of the transmission 10 and supported by a portion of the housing 12. The pneumatic plungers 110 and 111 are extended during the first, second and reverse speeds to engage detents 112 on the ring gear 96. This positively locks the ring gear 96 against rotational movement so that the output spindle 15 receives its drive solely from the sun gear 90 and planetary carrier 98. As discussed above regarding reverse operation, during first and second speed operation, all the toothed clutch means 78, 80 and 82 on shaft 18 are disengaged.

Figure 3A:
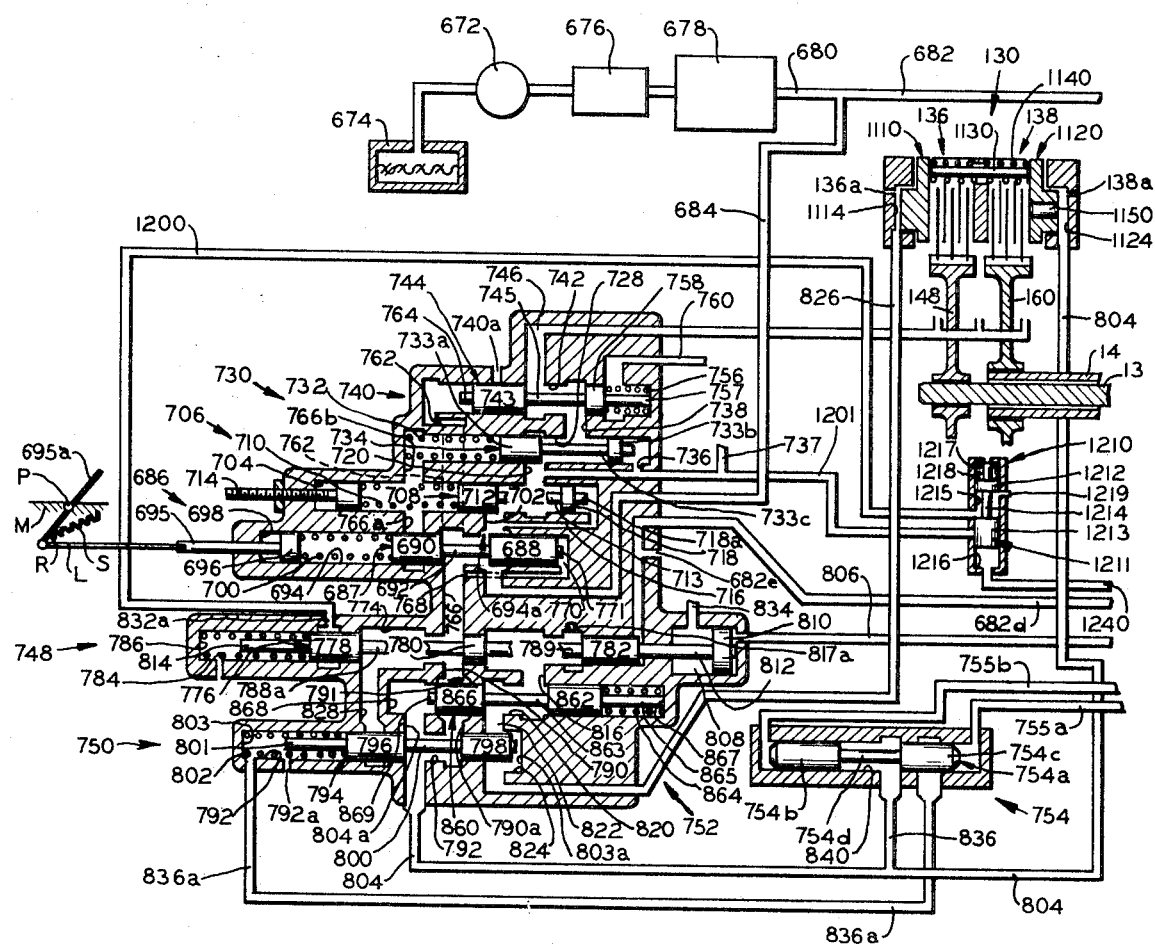
FIGS. 3A and 3B are schematic views of a control arrangement particularly suited for this transmission.

Referring now to FIGS. 1 and 3A for diagrammatic views and to FIG. 2 for a more detailed cross-sectional view, there is shown a clutch means 130 disposed at the leftward end of the transmission 10 for providing a driving connection between the engine or the flywheel of the vehicle and the through shaft 13 and input shaft 14. The clutch means 130 includes a housing 132 which is rotationally mounted relative to the housing 12 by a bearing means 134, the shaft 14, and bearing means 17a. A pair of hydraulic clutch packs generally indicated at 136 and 138 are disposed within the housing 132 to provide a driving connection between the engine and the through shaft 13 and input shaft 14, respectively. Thus, the housing 132, the clutch pack 138 and the input shaft 14 comprise an input means.

The clutch pack 136 includes a series of clutch plates 140 extending radially inwardly from the housing 132 and splined thereto for limited axial movement and unitary rotation. A series of friction faced clutch plates 144 extend radially outwardly from the through shaft 13 and are splined for limited axial movement and unitary rotation to a spindle means 148. The spindle means 148 rotates unitarily with the through shaft 13 and is attached thereto by splined section 150.

The clutch pack 138 includes a series of clutch plates 152 extending radially inwardly from the housing 132 and splined thereto for limited axial movement and unitary rotation. A series of friction faced clutch plates 156 extend radially outwardly from a spindle means 160 and are splined thereto for limited axial movement and unitary rotation. The spindle means 160 is mounted for unitary rotation with the input shaft 14 by a splined section 162.

Driving means is generally indicated at 164 for rotating the clutch means 130 and extends leftwardly therefrom. An annular member 166 is secured by a series of circumferentially spaced bolts 167 to the housing 132 and also attached to a plurality of flex plates 168 by bolts 170. A driving flange 172, attached to the engine of the vehicle, is bolted at 174 to the flex plates 168. Rotation of the vehicle engine drives the flex plates 168 and through them the housing 132. Steel clutch plates 140 and 152 move unitarily with the housing 132 and, when the clutch pack 136 or 138 is engaged, provide a driving connection between the vehicle engine and the through shaft 13 or input shaft 14, respectively.

Referring to FIG. 2, the clutch means 130 is shown in greater detail. The clutch pack 136 includes an annular pressure plate 1110 drivingly connected to the housing 132 by lugs 1110a and having an annularly shaped piston-type head 1112 received in an annularly shaped groove 1114 formed in the left interior side in housing 132 adjacent the clutch plates 140, 144. The pressure plate 1110 is responsive to oil pressure received from the control system into groove 1114 to the left of and acting on piston head 1112 to move the latter to the right and force the two series of clutch friction plates 140, 144 together and the clutch pack 136 against an annular reaction plate 1115 located between the clutch packs 136 and 138 and secured at its periphery to the housing 132, to thereby permit the engine to drive through shaft 13.

The clutch pack 138 includes an annular pressure plate 1120 drivingly connected to housing 132 by lugs 1120a and having an annularly shaped piston-type head 1122 received in an annularly shaped groove 1124 formed in the right interior side of housing 132 adjacent the clutch plates 152, 156. The pressure plate 1120 is responsive to oil pressure received from the control system into the groove 1124 to the right of and acting on piston head 1122 to move the latter to the left and force the two series of clutch friction plates 152, 156 together and the clutch pack 138 against the reaction plate 1115 thereby to permit the engine to drive input shaft 14.

To enable a positive separation of the annular pressure plates 1110, 1120 from the plates 140, 144 and 152, 156, respectively, for clutch release when engaging one clutch pack and disengaging the other clutch pack, a series of separator pins 1130 are located in bores 1132 formed in the clutch plates 140 and 152 extending between the inner faces 1111 and 1121 of the pressure plates. The length of each separator pin slightly exceeds the distance which would exist between the outermost friction plates of clutch packs 136, 138 when such would both be fully compressed. Thus, when a first of the pressure plates moves toward the friction plates in its associated clutch pack to cause engagement thereof, the separator pins are contacted enabling the first pressure plate to push the second pressure plate away from the friction plates in the second clutch pack to insure clutch release of the second clutch pack.

A series of compression springs 1140 are also provided in the bores 1132 around the pins 1130 and engage the inner faces 1111 and 1121 of the pressure plates. The springs 1140 resiliently urge or bias pressure plates 1110, 1120 away from each other to prevent clutch pack engagement by the pressure plate except in response to oil pressure in the grooves 1114, 1124 as noted. The springs 1140 also assist in pushing the piston-type heads 1112, 1122 into grooves 1114, 1124 to push oil out of vents provided for grooves 1114, 1124, as will be described later, to reduce clutch drag after clutch release.

A series of small synchronizing pistons 1150 have been provided in circumferentially spaced bores 1152 formed in the annular pressure plate 1120. The pistons 1150 are free to move toward friction plates 152, 156 in clutch pack 138 in response to oil pressure in groove 1124 even though the pressure plate 1120 is being forced away from plates 152, 156 by the advance of pressure plate 1110 toward plates 140, 144 and force exerted through the separator pins 1140. The small pistons are utilized to frictionally engage the clutch pack 138 during the synchronizing process to be described hereinafter in connection with the operation of the control system.

The method of shifting to obtain the various speeds of the transmission 10 will now be described. When the transmission 10 is in neutral all toothed clutch means on the shafts 16 and 18 are disengaged as shown in FIG. 1. To shift into first speed, the toothed clutch means 72 is moved rightwardly engaging the gear 52 in driving connection with shaft 16. At this time the pneumatic plungers 110 and 111 are engaged with the detents 112, preventing rotation of the ring gear 96. The connections for the first speed are then through the clutch pack 138, the input shaft 14, gear 32, gear 52, countershaft 16, gear 84, sun gear extension 88, and sun gear 90. The sun gear 90 drives the planetary carrier 98 through planet gears 99 to provide the output drive to the spindle 15, while the ring gear 96 remains stationary.

The transmission 10 is shifted into second speed by movement of the toothed clutch means 72 leftwardly, to disengage the gear 52 from and engage the gear 54 in a driving connection with the countershaft 16. Drive to the output spindle 15 is then from the input shaft 14, gear 34, gear 54, countershaft 16, drive gear 84, sun gear 90, and the planetary carrier 98; with the ring gear 96 again remaining stationary.

Third speed is obtained by the rightward shifting of the toothed clutch means 78 to drivingly connect gear 62 to countershaft 18, while the toothed clutch means 72 remains engaged with the gear 54. The input shaft now drives countershaft 16 as noted in the previous paragraph and also drives countershaft 18 through gears 32 and 62. The controls system which energizes the movement of the toothed clutch means 78 into engagement with the gear 62 also energizes the release of pneumatic plungers 110 and 111, as will be more fully described hereinafter, so that the ring gear 96 may now be driven from the shaft 18 through gears 92 and 94. The ring gear 96, sun gear 90, and planetary carrier 98 combine the outputs from countershafts 16 and 18 to provide a collected output on the output spindle 15.

Fourth speed is obtained by the leftward shifting of the toothed clutch means 78 so as to disengage the gear 62 from and engage the gear 64 in driving connection with countershaft 18, gear 64 being driven by gear 34 on the input shaft 14. The gear 54 is still engaged in driving connection with the countershaft 16. Again the planetary unit 91 combines the outputs of countershafts 16 and 18 to provide a collected output at the output spindle 15.

Shifting to fifth speed is accomplished by a rightward shifting of the clutch means 72, into a disengaged position between the gears 52 and 54, and a rightward shifting of the clutch means 74 into engagement with the gear 56 to provide a driving connection between gear 56 and countershaft 16, thus driving shaft 16 via gear 36 from input shaft 14. The gear 64 and clutch means 78 remain in engaged position so that the countershaft 18 still drives the ring gear 96 at the speed dictated by the gears 64 and 34.

Sixth speed is obtained by the rightward shifting of the clutch means 78 on the countershaft 18 into disengaged position between the gears 62 and 64 and the rightward shifting of the clutch means 80 into engaged position with the gear 66 on countershaft 18 to determine the speed of the countershaft 18 and ring gear 96 by the driving relation of the gears 66 and 36. In sixth speed the clutch means 74 remains engaged with the gear 56.

Seventh speed is obtained by the leftward shifting of the clutch means 74 on the countershaft 16 to provide a driving connection between the gear 58 and the countershaft 16 to change the speed of the sun gear 90, while the clutch means 80 remains engaged with the gear 66.

Eighth speed is obtained by maintaining the clutch means 74 engaged with the gear 58 and by the leftward shifting of the clutch means 80 on the countershaft 18 to provide a driving connection between the gear 68 and the countershaft 18 to increase the speed of the ring gear 96.

Ninth speed is obtained by a rightward shifting of the clutch means 74 out of engagement with gear 58 and then the rightward shifting of clutch means 76 into engagement with the gear 60 on the countershaft 16 to drive the sun gear 90 at a higher speed.

In order to shift the transmission into 10the speed, the clutch means 80 is shifted rightwardly on the countershaft 18 into a disengaged position between the gears 66 and 68, and the clutch means 82 is shifted rightwardly on the countershaft 18 to engage the gear 70, increasing the speed of the ring gear 96. The clutch means 76 remains engaged with the gear 60.

Eleventh speed is obtained by providing a direct drive connection between the vehicle engine and the output spindle 15. Clutch pack 136 is engaged to provide a direct drive between the flywheel of the engine and through shaft 13 and the clutch pack 138 is disengaged while clutch means 82 is shifted leftwardly into a disengaged position on countershaft 18 to enable a pin valve 650 to provide a "neutral" signal as will be described hereinafter. Through shaft 13 then drives the carrier 98 and the output spindle 15 at the speed of the engine.

Synchronization of the transmission during an upshift is obtained by the utilization of the clutch packs 136 and 138. Assume, for example, that the transmission 10 is in third speed and it is desired to shift the transmission into fourth speed. The clutch means 78 has to be shifted from driving engagement with the gear 62 into driving engagement with the gear 64, both on countershaft 18. Because the gear 62 and clutch means 78 are rotating at the same speed upon shifting, disengagement between them is easily obtained. Any torque lock between associated gears and toothed clutch means may be overcome by the use of standard throttle dip or clutch release techniques. In the embodiment described herein, the air cylinders used for shifting become operative to shift the associated toothed clutch means out of engagement when the clutch pack 136 becomes partially engaged and clutch pack 138 partially released.

However, the gear 64, as driven by the gear 34, is rotating at a higher speed than the clutch means 78 so that meshing of the teeth therebetween cannot easily be obtained until the gear 64 and clutch means 78 are rotating at essentially the same speed.

Therefore, clutch pack 138 is partially disengaged and allowed to slip prior to the initial movement of the clutch means 78 into a neutral or disengaged position, the slipping of the clutch 138 reducing the torque between clutch means 78 and gear 62 enabling the clutch means 78 to be disengaged, and the clutch pack 136 is engaged to provide a direct drive from the driving means 164 to the through shaft and the output spindle 15 which is drivingly connected to the vehicle wheels. Since the output spindle 15 is rotating slower than the engine and the driving means 164, the engaging of the clutch pack 136 allows the inertia of the vehicle wheels to slow the vehicle engine. Simultaneously, the slipping clutch pack 138 transfers sufficient torque between the through shaft 13 and the input shaft 14 so that the input shaft speed is also quickly reduced toward the speed of the through shaft 13. As shaft 14 slows down, the gear 34, unitarily rotating therewith, also slows in speed thereby slowing the speed of gear 64 meshed therewith. When the speed of the gear 64 reaches the speed of the clutch means 78, the gear 64 is engaged by the clutch means 78. Clutch pack 136 is then disengaged and clutch pack 138 is fully reengaged, placing the driving means 164 in driving relationship with the ring gear 96 through the clutch means 138, the input shaft 14, the gears 34 and 64, the tooth clutch means 78 and shaft 18. The transmission 10 is now in fourth speed.

Each of the other upshifts of the device from first speed through tenth speed are obtained in substantially the same manner as can be easily ascertained by a view of FIG. 1.

The device is placed into reverse gear at such times as all the beveled tooth clutch means on countershafts 16 and 18 are disengaged, by the engagement of reverse clutch means 104 with the gear 102 thereby placing the reverse shaft 100 into driving engagement with the gear 102. The plungers 110 and 111 are activated to extend and engage the projections 112 on the ring gear 96. Power is from the gear 32 on the input shaft 14, to the gear 52 rotating about the shaft 16, then to the gear 102 and the reverse shaft 100, to the reverse gear 106, gear 88 and to the sun gear 90; the ring gear 96 acting as a stationary reaction means. Reverse rotation is thereby imparted to the output spindle 15.

Figure 3B:
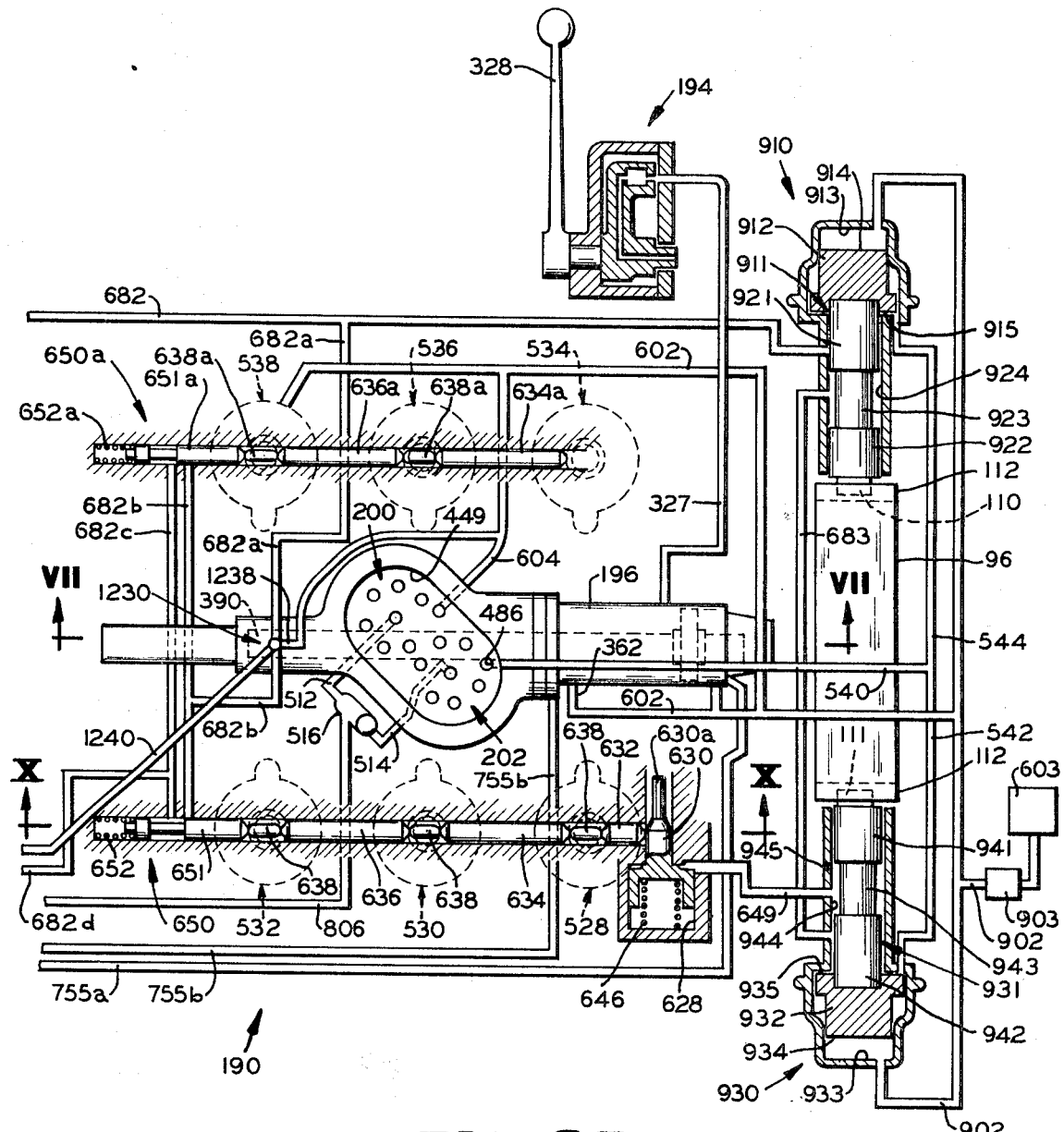

Referring to FIGS. 3A and 3B there is illustrated schematically a control arrangement 188 for actuating the shifting of the transmission 10. This control arrangement comprises both a pneumatic control system 190, FIG. 3B, and a hydraulic control system 192, FIG. 3A.

The pneumatic control system 190 includes a 13 position (11 forward speeds, reverse and neutral) manual selector valve 194 that is mounted in the cab of a vehicle for actuation by the vehicle operator (shown in greater detail in FIGS. 4, 5 and 6). The manual selector valve 194 is connected to a multiposition linear actuator or servo cylinder 196 (shown in greater detail in FIGS. 7 and 8) linearly movable dependent upon the position of the selector valve. The linear actuator 196 when the plunger 860 a rack gear 198 formed on a piston rod 197 of a piston means 350 in the actuator 196 and controls the position of two multiposition selector valves 200 and 202 (shown in greater detail in FIGS. 7, 8 and 9) that feed and exhaust pneumatic pressure to and from six pneumatically actuated cylinders 528, 530, 532, 534, 536 and 538 (shown in greater detail in FIGS. 9 and 10) which control the shifting of the clutch means 78, 80, 82, 72, 74 and 76, respectively.

Referring to FIGS. 4, 5 and 6, it can be seen that the manual selector valve 194 includes a valve body member 220 attached to a valve plate 222 by a series of bolts 224 spaced around the valve plate 222 adjacent the periphery thereof. The valve body member 220 and valve plate 222 have a shape substantially that of a segment of a circle in the elevational view (FIG. 4) with the arcuate extent of the segment approximating 135°. The left side of the valve body member 220 and valve plate 222 are spaced axially from each other by a flange 226 integral with the valve body member 220 and extending rightwardly from the medial portion thereof to provide a space 223 between the left side of the valve body member and the valve plate 222. The valve body member 220 thereby serves as a front face for the selector valve 194 and the valve plate 222 as the back face for the selector valve. The flange 226 also provides an attaching means for the inwardly extending bolts 224 and a seating face for the gasket 227 to insure that a seal is maintained between the valve body member 220 and the valve plate 222.

Radially and angularly extending webs 228 and 230 on the valve body member 220 extend inwardly from the outer periphery of the valve body member adjacent its ends to strengthen and add rigidity to it and provide support for a shift lever positioning plate 246 integrally formed with the valve body member 220 and providing the outer circular periphery of the manual selector valve 194.

The shift pattern of the lever positioning plate 246 is illustrated in FIG. 6 and includes a tortuous shifting slot 248 that extends circumferentially along the curved periphery of the valve body member 220. Slot 248 takes the form of a series of steps and a series of positioning or detent notches along one side of the length of the slot, each of the notches corresponding to one of the shift positions of the transmission 10. A notch 250, forming a portion of the slot 248, provides the reverse shift position of the manual selector valve 194 and thereby the transmission 10. A notch 252 provides the neutral position for the transmission 10, while a series of notches 254, 256, 258, 260, 262, 264, 266, 268, 270, 272 and 274 correspond to the 11 forward speeds, respectively, of the transmission 10.

Adjacent the lower portion of the valve body member 220 and substantially at the apex thereof formed by the radially inwardly extending webs 228, 230 is a hub portion 232 that is formed integrally therewith and through which a control shaft 234 extends for journaled rotation. The opposite end of the control shaft 234 is journaled in an integral hub portion 236 of the valve plate 222. A shift lever 238 (shown in reverse position in full lines in FIGS. 4 and 5 and in the 11th speed position in dotted lines in FIG. 4) extends upwardly from the control shaft 234 and is pivotally mounted thereto by a pin means 242 extending through a clevis or U-shaped portion 240 of the control shaft 234. Shift lever 238 is substantially cylindrical in shape and extends through the shifting slot 248 of the positioning plate 246 to be movable therealong and engageable with any one of the notches 250 to 274 as the transmission 10 is shifted through its various drive positions by the vehicle operator. A knob 294 is mounted on the end of the shift lever 238 to provide a convenient handle for manipulation of the shift lever 238 by the vehicle operator.

Shift lever 238 is positively maintained in any one of the notches 250 to 274, upon manual movement thereto, by a spring means 276 which continuously biases the shift lever 238 against the side of the shifting slot 248 which contains the positioning notches 250 through 274. This spring means comprises a spring support member 278, a coiled spring 280, and a control shaft spring support member 282. The spring support member 278 extends into and is attached to the shift lever 238 at its bottom portion so as to be journaled therewith in the clevis portion 240. An integral lug portion 284 of the spring support member 278 depends therefrom to be disposed below the pin means 242 and is provided with an aperture 286 which receives and retains one end of a spring 280.

As best seen in FIG. 5, spring 280 extends rightwardly and downwardly from the lug 284 and is attached to the control shaft spring support member 282 by a downwardly extending arm 288 supported on the control shaft 234. The control shaft spring support member 282 is held against a shoulder 290, formed on the clevis portion 240, by the spring 280. The portion of the shift lever 238 in the shifting notch 248 is thus always urged against the left side of the shifting slot 248 (as viewed in FIG. 5) to resiliently hold lever 238 in the shifting notch or detent position into which it has been manually placed.

Mounted between the valve body 220 ad valve plate 222 and within the space 223 is a valve shift member 292 fixed for unitary rotation on the control shaft 234 by a set screw 293.

To provide the pneumatic actuation of the valve 194 valve plate 222 includes a series of threaded apertures 298, 300, 302, 304, 306, 308, 310, 312, 314, 316, 318, 320 and 322 (best seen in FIG. 4), each of these apertures or ports corresponding to one of the shift positions of the transmission 10. A fitting 324 as illustrated in FIG. 5 is received in each of these apertures for connection to a conduit 327 (one shown in FIG. 3B) which leads to the multiposition linear actuator 196. The apertures 298 to 322 are circumferentially spaced and provided in two radially spaced rows which extend around the arc segment defined by valve plate 222. The apertures may be provided in a single row if the area of the valve plate 222 is increased to accommodate them.

The valve shift member 292 has chambers 326 and 328 formed therein which respectively contain nylon button members 330 and 332. Each of the button members has an axially extending passage 334 through the center thereof so that air may flow therethrough into the chambers 326, 328 in the valve shift member 292 as seen in FIG. 5. A coiled compression spring 329 disposed in each of the chambers 326, 328 biases the button members 330, 332 to the right into a sealing relationship with plate 222.

The button members 330 and 332 are disposed on two different radii and are aligned so that only one button member at a time will be seated over one of the apertures 298 to 320 when the shift lever 238 is in any one of the shift positions of the transmission 10. Air may flow from chambers 326 and 328 through a passage 338 communicating with the chambers and extending downwardly through the valve shift member 292 and through a horizontally extending passage 340 in the control shaft 234. The passage 340 is open to the atmosphere. Thus, the manual selector valve 192 may selectively bleed pneumatic pressure from any one of the 13 ports 298, 322 to atmosphere as the shift lever 238 is moved to any one of its 13 positions to signal a shift of the transmission 10. Each fitting 324 incorporates a suitable one way valve means therein to inhibit undesired venting.

Figure 7:
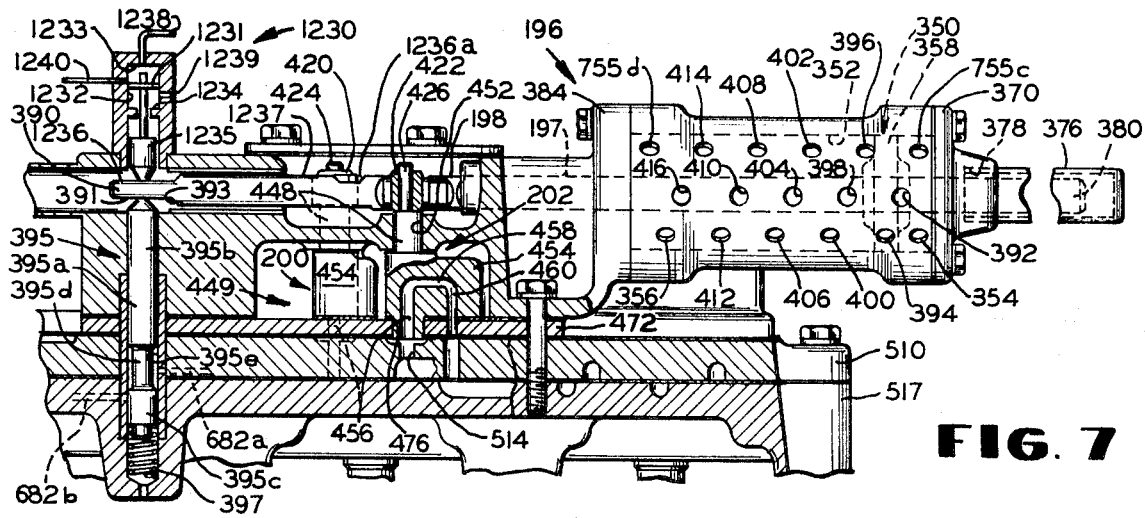
FIG. 7 is an enlarged side elevational view, taken partially in section along lines VII-VII in FIG. 3B, of the transmission illustrating a multiposition servocylinder, multiposition valves, and shifting forks responsive thereto.
Figure 8:
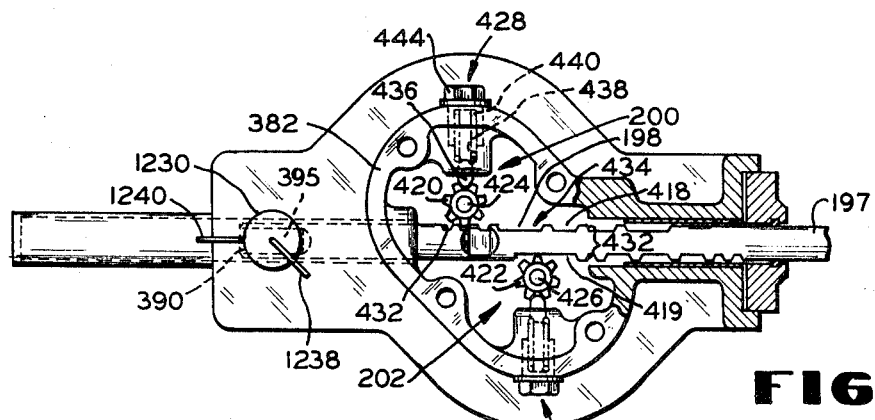
FIG. 8 is a plan view partly in section of a double rack gear and the multiposition valves responsive thereto.

Referring now to FIGS. 7 and 8, the multiposition linear actuator or servocylinder means 196 generally includes a double acting piston means 350 disposed in a cylinder 352 which is connected to the fitting and apertures in the manual selector valve 194 by a series of conduits, such as the conduit 327 shown in FIG. 3B, so that the bleeding of air pressure from one of the apertures 298 to 322 to atmosphere reduces the air pressure in the servocylinder 196. Air pressure is supplied to the multiposition servocylinder 196 through a conduit 602 and a pair of conduits 360, 362 (FIG. 3B) connected to a pair of orifices 354, 356 (FIG. 7) by suitable fittings (not shown), the orifices 354, 356 being disposed near opposite ends of the cylinder 352. The equal pressures on each side of a piston head 358 of the double acting piston means 350, disposed intermediate the orifices 354, 356 in the cylinder 352, balance when the manual selector valve 194 is not bleeding a portion of the supply pressure to atmosphere causing the piston head 358 to maintain a selected position in cylinder 352.

The piston head 358 is sealingly engaged with the internal face of the wall of the cylinder 352 by the provision of an "O"-ring and a packing ring seated in a groove machined in the piston head in a manner well known in the art to prevent leakage around the piston head 358.

At the right end of the cylinder 352 as viewed in FIG. 7, an end cover 370 is provided. The cover 370 is sealingly attached to the cylinder 352 by bolts. A piston end cap 376 is press fitted into a bore 378 provided in the end cover 370 to provide protection for an extending end 380 of piston means 350. A valve housing means 382 has a rightwardly extending portion 384 which serves as an end cover for the cylinder 352 and is sealingly attached thereto.

Figure 9:
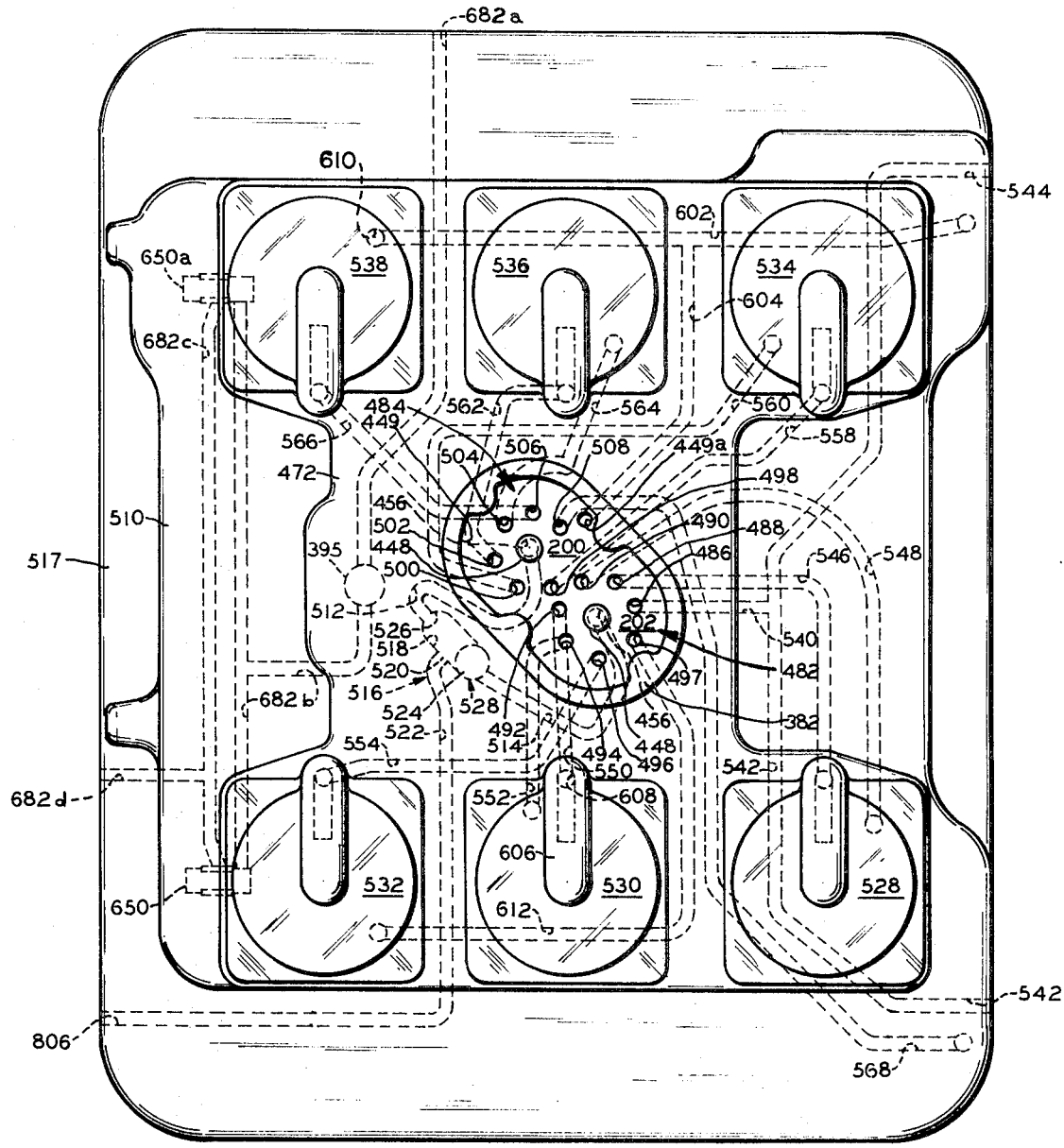
FIG. 9 is a plan view of apparatus shown in FIG. 7 illustrating the conduit layout and port connections for the various valves and pneumatic actuators.

As seen in FIGS. 7 and 9, end portion 390 of rod 197 of piston means 350 extends leftwardly beyond the cylinder 352 and includes a land area 391 and a cam surface 393. Disposed below the portion 390 and extending into the valve housing means 382 is a hydraulic supply valve 395. The valve 395 includes a plunger 395a having spaced land portions 395b, 395c connected by a stem portion 395d, the plunger being disposed in a bore 395e. As best seen in FIG. 7 the valve 395 is biased upwardly into closed position by a resilient spring 397 acting against land portion 395c, and is cammed downwardly by surface 393 acting against an extension of land portion 395b into open position by leftward movement of portion 390 of the piston 350. Oil will flow around stem portion 395c of valve 395 in a manner well known in the art from conduit 682a to conduit 682b (best seen in FIG. 3B) when the stem portion 395d is cammed downwardly to the open position for the valve 395. As illustrated in FIG. 7 hydraulic valve 395 is in the upper, closed position it maintains during the reverse, neutral and first speed shift positions. The valve 395 is open for speeds two through 11.

A plurality of threaded apertures are provided in the cylinder 352 comprising apertures 392, 394, 396, 398, 400, 402, 404, 406, 408, 410, 412, 414 and 416. These apertures correspond to and are associated with the apertures 298 to 322, respectively, in the manual selector valve 194, each of the corresponding sets of apertures being connected by a conduit such as shown at 327. Bleeding of the air pressure from a particular aperture in the manual selector valve 192 provides a bleeding of air pressure from a corresponding aperture in the multiposition servocylinder means 196. Since the piston head 358 has a constant supply pressure provided to both sides thereof through supply orifices 354 and 356, the piston head 358 will move along the cylinder 352 towards the end of the cylinder from which the pressure is being bled and thereby reduced. Piston head 358 will continue its movement until it moves over the aperture from which pressure is being bled. The pressure on both sides of piston head 358 of double acting piston 350 is then again in balance, but the linear movement along the cylinder 352 has provided a driving linear motion to the portion 390 of piston means 350.

The portion 390 of the double acting piston means 350 also includes a double rack gear portion 198 which includes rack gears 418, 419 formed on opposite sides of rod 197 (best seen in FIG. 8) and disposed rightwardly of the camming surface 393 and within the valve housing means 382. The rack gears 418, 419 drive a pair of pinion gears 420, 422 of selector valves 200, 202, respectively. The gears 420, 422 are mounted and fixed against rotation on pins 424 and 426 pivotally supported in the valve housing. Linear movement of the double rack gear portion 198 selectively rotates pinion gears 420 and 422 to position the selector valves 200 and 202.

A centering means 428 (FIG. 8) is provided for each of the valves 200 and 202 to insure proper alignment of the operating elements of selector valves 200 and 202 after piston head 358 stops its travel.

Each centering means 428 comprises, at the location of each pinion 420 or 422, a poppet pin 436 slidingly disposed in a bore 438 of the valve housing means 382 and positioned radially with respect to the pinion gears 420, 422. A coiled compression spring 440 in the bore 438 biases the poppet pin 436 outwardly into mesh with the pinion. The strength of the spring is sufficient to center the pinion 420 or 422 but insufficient to provide a force that would interfere with rotation of the pinion by the double rack gear 418. A cover cap 444 retains the spring 440 in the bore 442. The spring 440 resiliently urges the pin 436 in a direct line of action and reaction.

Each of the pins 436 is dimensioned so as to mesh between two of the teeth of its associated gear thereby centering and retaining the gear in a selected position to provide a series of positive stops for the pinion gears 420 or 422 and thus a series of positively held positions for piston means 350 and valves 200, 202.

The teeth 432 of the double rack gear portion 198 may be spaced so that only one of the pinions 420 or 422 is engaged and moved by the double rack gear portion 198 during any portion of its travel. Thus, a series of spaces between teeth 432, for example, space 434, are provided on both sides of the double rack gear portion 198 so that selective engagement occurs with one pinion gear at a time during leftward or rightward movement of the double rack gear portion 198.

Turning again to FIG. 7, it can be seen that the pinion mounting pins 424 and 426 are each integral, upwardly extending portions of valve pivot shafts 448. Each of these shafts extends downwardly from its pinion mounting pin and is journaled within valve housing means 382 by bearing means disposed in bores 452 in the valve housing means.

Below the bores 452, the valve pivot shafts 448 each have an enlarged portion 454 extending radially outwardly in a pressurized chamber 449 formed between the valve housing 382 and a separator plate 472. Each portion 454 extends radially a sufficient distance so that it will permit positioning above a series of ports surrounding each valve. An upwardly axially extending bore 456 centered in the cylindrical portion of valve pivot shaft 448 merges with an air passage formed by horizontally extending bore 458 in the radial extension portion 454. The other end of bore 458 merges with downwardly extending bore 460 formed in radial portion 454. Plastic sliding seal buttons similar to those described for use in the valve 194 may be used in bores 460.

The bores 460, bores 458 and bores 456 of each of the valves 200, 202 thus form an air exhaust passage that may be selectively placed over any of a series of ports surrounding each of the valves 200, 202 to exhaust air from within the pneumatic actuators to engage or disengage the toothed clutch means on countershafts 16 and 18.

The separator plate 472 is sealed against the valve housing means 382 by a gasket extending around the periphery thereof and disposed between the separator plate and valve housing means. The valve pivot shaft 448 is pivotally and sealingly received in a bore 476 in the separator plate 472. Attachment of the separator plate to the valve housing 382 is provided by a series of bolts.

Referring to FIGS. 3B and 9, it may be seen that two series of port means 484, 482 are provided in separator plate 472 for continuing the air passages extending from bores 460 of the valves 200, 202 to exhaust air from the pneumatic actuators. Each series is disposed around its respective valve and spaced along the circumference of a circle having a radius enabling selective registration of a bore 460 therewith.

A series of seven equally spaced ports 486, 488, 490, 492, 494, 496 and 497 comprise the port means 482 around valve shaft 448 of valve 202.

Similarly, port means 484 comprises a series of six ports disposed circumferentially around shaft 448 of valve 200, the ports being designated 498, 500, 502, 504, 506 and 508, and are spaced equally with the exception of ports 498 and 508 which have a double space therebetween.

Air may be exhausted from each of the passageways 456 in shafts 448 of the multiposition selector valves 200, 202 into a cover control member 510 of platelike configuration through passageways 512 and 514, respectively, (seen also in FIG. 7) formed in the cover control member 510. The passageways 512, 514 extend generally downwardly and merge into oblique passageways formed in a control housing 517. Exhausted air flows through passageways 512, 514 which are connected to opposite sides of an alternating or ball check valve 516.

The ball check valve 516 includes a check valve body member 518 (see FIG. 9). Intermediate the ends of the check valve body member 518, a port 520 is provided opening into passageway 522 extending through the control housing 517 and control member 510, thus providing a passageway to conduit 806 FIGS. 3A and 3B) in another portion of the pneumatic control system 190 to be described later.

A ball check member 524 is mounted within the check valve body member 518 and movable laterally therein to abut and seal a seating face 526 formed in the left end of the check valve body member or against a seating face 528 formed in the right end of the check valve body member. The ball member 524 prevents passage of exhaust air from one of the passageways 512, 514 into the other of the passageways 512, 514, thereby assuring that all exhaust air from either passageway 512 or 514 flows out through passageway 522.

The aforementioned ports 486 to 508 in the separator plate 472 lead to distribution channels milled or otherwise formed in the bottom face of the control cover 510 and channels milled in the top face of control housing 517. Each passageway, in turn, positively connects the ports 486 to 508 to a series of pneumatic piston actuators 528, 530, 532, 534, 536 and 538 (some having three operative positions and some having two operative positions) which control the shifting of toothed clutch means 72 through 82 and 104. A passageway also connects the pneumatic plungers 110 and 111 to restrain or permit rotation of the ring gear 96.

The distribution channels in the control cover 510 and control housing 517 can best be seen in FIG. 9. Referring to port means 482 associated with the valve pivot shaft 448 integral with pin 424 and a part of valve 202, a passageway is provided by a channel 540 extending from port 486 along the bottom face of the control cover 510 to branch into channels 542 and 544 that extend to the extremities of the control cover 510 for connection to pneumatic plungers 110 and 111 to provide an exhaust passage for air so that the ring gear 96 may be held in fixed nonrotatable position for first, second, reverse and neutral speeds.

Still referring to valve 202, a passageway is provided by a channel 546 extending from the port 488 to the upper half of pneumatic actuator 528. Exhausting air through channel 546 will cause the pneumatic actuator 528 to place the clutch means 78 in a third speed position, moving the clutch means 78 to the right in FIG. 1 into engagement with gear 62. A passageway is provided by channel 548 extending from port 490 to the lower half of pneumatic actuator 528, so that when air is exhausted therefrom clutch means 78 will be placed in its fourth and fifth speed positions, moving the clutch means 78 to the left in FIG. 1 out of engagement with gear 62 and into engagement with gear 64. A passageway is provided by a channel 550 extending from the port 492 to the upper half of pneumatic actuator 530, and will place clutch means 80 in its sixth and seventh speed positions when air is exhausted therefrom, moving the clutch means 80 to the right in FIG. 1 into engagement with gear 66. A passageway provided by a channel 552 extending from the port 494 to the lower half of pneumatic actuator 530 will place clutch means 80 in its eighth and ninth speed positions when air is exhausted therefrom, moving clutch means 80 to the left in FIG. 1 out of engagement with gear 66 and into engagement with gear 68. A passageway provided by a channel 554 extending from the port 496 to the upper half of pneumatic actuator 532 may be utilized to exhaust the air therefrom and place the clutch means 82 into its 10th speed position, moving clutch means 82 to the right in FIG. 1 into engagement with gear 70.

A passageway provided by a channel 612 extending from the port 497 to the lower half of actuator 532 may be utilized to exhaust the air therefrom and return the clutch means 82 to its neutral position, moving clutch means 82 to the left to its disengaged position.

The port means 484 disposed about the valve pivot shaft 448 associated with pin 426 of valve 200 are all also provided with passageways to pneumatic actuators. A passageway provided by a channel 558 extending from port 498 to the upper half of pneumatic actuator 534 may be utilized to exhaust air therefrom to move the clutch means 72 into its first speed position, moving clutch means 72 to the right in FIG. 1 into engagement with gear 52. A passageway provided by a channel 560 extending from port 500 to the lower half of pneumatic actuator 534 will provide an exhaust therefor to move the clutch means 72 into its second, third and fourth speed positions, moving clutch means 72 to the left in FIG. 1 out of engagement with gear 52 and into engagement with gear 54. A passageway provided by a channel 562 extending from port 502 to the upper half of pneumatic actuator 536 will provide an exhaust therefrom to move the clutch means 74 into its fifth and sixth speed positions, moving clutch means 74 to the right in FIG. 1 into engagement with gear 56. A passageway provided by channel 564 extending from port 504 to the lower half of pneumatic actuator 536 may be utilized to exhaust air therefrom to move the clutch means 74 into its seventh and eighth speed positions, moving clutch means 74 to the left in FIG. 1 out of engagement with gear 56 and into engagement with gear 58. A passageway provided by a channel 566 extending from the port 506 to the upper half of pneumatic actuator 538 may be utilized to exhaust air therefrom to move the clutch means 76 to its ninth speed and 10th positions, moving clutch means 76 to the right in FIG. 1 into engagement with gear 60. A passageway is provided by a channel 568 extending from the port 508 to adjacent the rightward extent of control cover 510 for connection to a pneumatic actuator of the same construction or pneumatic actuator 538 (two operative positions), which will move the reverse clutch means 104 into engaged position in response to exhausting the air therefrom, moving clutch means 104 to the right in FIG. 1 into engagement with gear 102.

The double space between the ports 498 and 508 provides a nonported location for the enlarged portion of the pivot shaft 448 of valve 200 to occupy without venting any of the ports 498 to 508 when the valve 200 is in its position corresponding to the neutral position for the transmission and none of the clutch means 72 to 76 are engaged.

It should be noted that the above description of each port and associated channel connecting an actuator for exhaust or pressurization mentioned only the positioning of one toothed clutch means per port to provide a particular speed for the transmission 10 although some speeds require the engagement of two of the toothed clutch means. Since the double rack gear portion 198 has spaces wherein no teeth 432 are provided, the valve pivot shafts 448, 448 of valves 200, 202, may position passageways 460, 460 directly over two of the ports 486 to 508 at one time. Thus, one of the upper clutch means 72, 74 or 76 and one of the lower clutch means 78, 80 or 82 may be out of their neutral positions at the same time and engaged with one of the plurality of gears on the shafts 16 and 18 to provide the gear positions equivalent to first through eleventh speeds. However, because of the sequence of engagement described above no "double swap" is required to move upwardly or downwardly from one speed to another; however, the structure of this transmission does not prevent double swap shifting if such is desired by suitable modification of the control system and proper selection of ratio gears.

Figure 10:
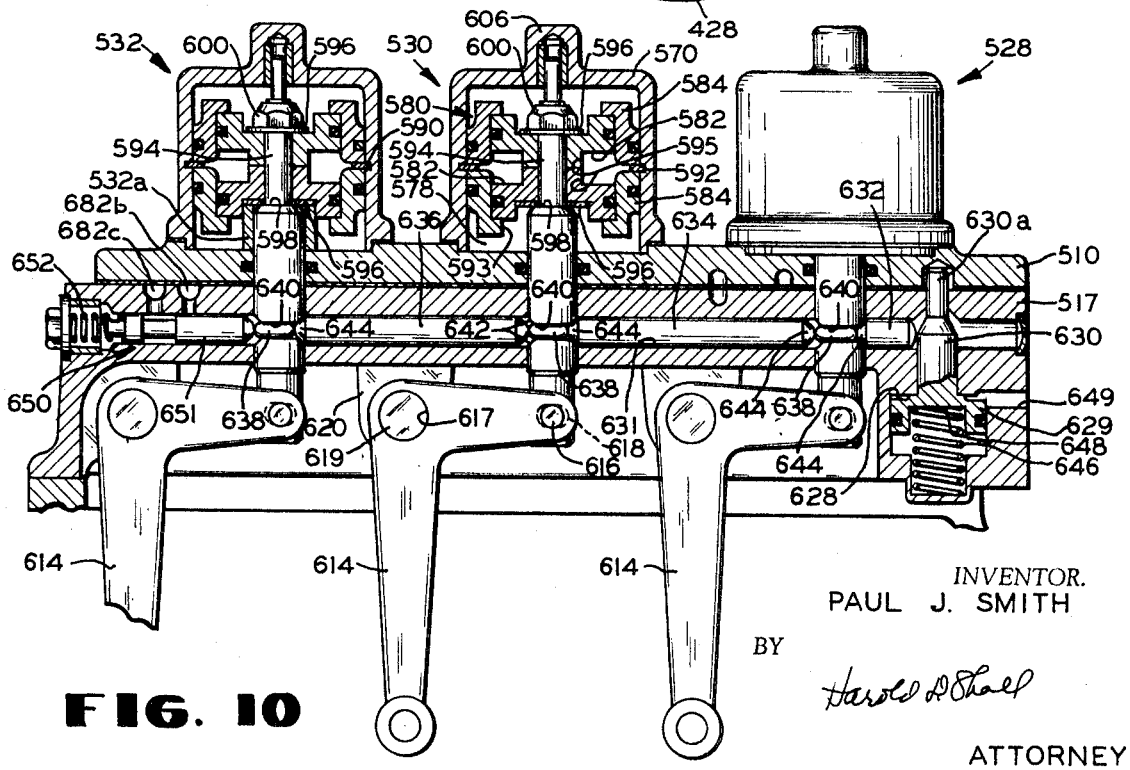
FIG. 10 is an enlarged side elevational view, taken partially in section along lines X-X, of the apparatus illustrated in FIG. 3B.

One of the three-way pneumatic actuators will now be described, it being understood that the other pneumatic actuators are generally similar in structure and function. In FIGS. 9 and 10, the pneumatic actuator 530 is shown as including a housing 570 which may be mounted on the control cover 510 by a series of bolts extending through an integral housing flange of the housing and into the control cover 510. A gasket may be positioned between the flange and control cover 510 to provide a sealed piston chamber of cylinder 578 within the housing 570. Slidably mounted within the cylinder 578 is a three-position piston means 580 including a pair of inner piston heads 582, 582 secured in abutting relationship on piston rod 594 and a pair of outer piston heads 584, 584, each mounted for axial movement on its associated inner head and within cylinder 578 formed in housing 570.

Each of the outer piston heads 584 sealingly engages an inner surface thereof with an outer surface of its associated inner piston head by means of "O"-ring disposed therebetween. The outer surface of piston heads 584, 584 are each also provided with an "O"-ring disposed against the surface of the cylinder 578 in housing 570 to provide a pressure seal therebetween.

Travel past the center of the cylinder 578 in housing 570 by the outer piston heads 584, 584 is prevented by a snap ring 590 received in a circumferential groove 592 machined in the piston cylinder formed in the housing 570. A shoulder 593 formed on the axial outer end of each of the outer piston heads 584 and extending inwardly insures that its associated inner piston head 582 is engaged thereby and moves therewith when either of the outer piston heads 584 moves towards the other.

The piston shaft or rod 594 extends through a bore 595 provided in each of the inner piston heads 582, 582. Washers 596, 596 abut oppositely disposed faces on the internal piston heads 582, 582 and hold the inner heads in a fixed position on the piston shaft 594 between a shoulder 598 formed on the piston shaft and a retaining nut 600 on shaft 594 above and displaced from the shoulder 598.

Operation of the pneumatic actuator 530 will now be explained, assuming an initial position of the piston means 580 in the center of cylinder 578 as shown in FIG. 10. When the pressure is reduced on the upper side of the three-way acting piston means 580, a higher pressure acting on the lower side thereof pressing only against the area of lower internal piston head 582 as a working surface moves both internal piston heads 582, 582 and the upper external piston head 584 upwardly. Similarly, if the pressure against the lower side of the three-way acting piston means 580 is reduced, a higher pressure on its upper side acts only against the upper inner piston head 582 to move it, the lower inner piston head 582 and the lower outer piston head 584 downwardly.

In addition to the movement last described, if the pressure below the lower side of the piston means 580 is again raised, this pressure works against the area of both the lower inner and outer piston heads 582 and 584, respectively, urging them and the upper inner piston head 582 upwardly into neutral position in engagement with the snap ring 590 as shown in FIG. 10.

The resisting pressure against such movement toward neutral is provided only by the pressure above upper outer piston 584 and the upper inner piston 582. The upper outer piston 584 has been moved to the central position against snap ring 590 by this pressure. Thus, although the air pressure above the piston means 580 is the same as the air pressure below the piston means 580, the combined lower pressure receiving surface areas of lower pistons 582, 584 exceeds the pressure receiving surface area of upper piston 582 permitting movement of lower piston 584 and pistons 582, 582 to the neutral or central position.

Pressurized air is normally supplied to both sides of the three-way pneumatic actuator 530 by a supply channel 602 (upper side of FIGS. 3B and 9) extending through the control cover 510; this channel being constantly provided with pressure from an air supply 603 (see FIG. 3B). Channel 602 joins with a channel 604 that communicates with the chamber 449 through a port 449a in the valve housing 382 to thereby pressurize all the open ports 486 and 508. This pressure is impressed on the lower side of the three-way acting piston 580 of actuator 530 through the port 494 and passageway 552, and on the upper side of the three-way acting piston 580 from port 492 through passageway 550 leading to an extension 606 on the top and rearward side of housing 570 of three-way pneumatic actuator 530. The extension 606 has formed therein an upwardly extending channel 608 which opens into the cylinder in housing 570 on the upper side of the three-way acting piston means 580.

The pneumatic actuators 528, 532, 534 and 536 are each supplied with pressurized air on their upper and lower sides through chamber 449 and a pair of the previously described channels leading to the upper and lower sides of each of these actuators in a manner similar to that just described for the pneumatic actuator 530.

Pneumatic actuators 532 and 538, although somewhat similar to the previously described three-position pneumatic actuators, are only two-position cylinders in that they provide a neutral and a single engaged position for their respective clutches 82 and 76. Many conventional double acting pneumatic means of convenient size will operate satisfactorily. The actuators 532 and 538 are normally supplied with pressurized air on their upper sides through channels 554 and 566 which, as explained previously, may also provide for the exhaust of pneumatic pressure from the upper side of these actuators.

It is to be understood that the lower side of the pneumatic actuator 538 is constantly pressurized by supply channel 602 through a port 610 communicating with the lower side of the pneumatic actuator. Upon exhaust from the upper side thereof a piston means, similar to that described for actuator 530 in pneumatic actuator 538 moves the clutch means 76 into engaged position. With channel 566 exhausted, the supply pressure on the opposite or lower side of the pneumatic actuator 538 maintains clutch means 76 in engaged position. The effective working area or pressure receiving surface of the piston means in actuator 538 is larger on its upper side or face than on the lower side. Therefore repressurization of the upper side of pneumatic actuator 538 will move its piston means, and thus the clutch means 76, to neutral position.

The pneumatic actuator 532 is pressurized or exhausted on the lower side by the channel 612 from port 497 of valve 202 and on the upper side by passageway 554 leading from port 496 of valve 202. However, as seen in FIG. 10, an annular sleeve 532a is received about the piston rod 594 and the lower end of the sleeve abuts the top of the control cover 510, while the upper end of the sleeve adapted to engage the lower face of the washer 596 so that, when the upper portion of actuator 528 is exhausted and with the lower portion pressurized, the piston rod 594 will be moved upwardly by the piston 582 which moves the clutch 82 to its engaged position in 10th speed. However, when the lower portion is exhausted, and the upper portion is pressurized, the rod 594 will only move downwardly to the neutral position since the sleeve 532a will prevent further downward movement. The difference between actuators 532 and 538 is provided so that, even though both operate to two positions in a similar fashion, an exhaust pressure is obtained from actuator 532 when shifting downward into its 11th speed position and this exhaust pressure is used to initiate engagement of the direct drive clutch 136. Upon repressurization of the lower portion of actuator 538 with the top portion pressurized, the piston 580 will remain in the same position with equal pressure on the top and bottom thereof.

Referring again to FIG. 10, each of the pneumatic actuators 528, 530, 532, 534, 536, and 538 at the lower end of the piston shafts 594 is connected to one of a series of shift lever forks 614 (only the three below actuators 528, 530 and 532 being shown in FIG. 10). Each of the shift lever forks 614 is formed in a bellcrank shape and is connected to its respective piston shaft by a pin 616 on each fork 614 extending from an upper leg of the shift lever fork 614 to be pivotally received in an elongated aperture 618 in the piston shaft 594. Each of the shift lever forks 614 are supported on a pivot 619 which may be an integral part of an extension 620 projecting downwardly from control housing 517. The pivot 619 extends into a pivot opening 617 formed in the apex of the bellcrank-shaped forks. The lower legs of shift forks 614 are engaged with their respective toothed clutch means on countershafts 16 and 18 to effect right and left movement of the toothed clutch means in response to piston movements in the pneumatic actuators in up and down directions, respectively, past the "neutral" or centered positions of the piston means therein.

Means illustrated in FIGS. 3B and 10 are provided to prevent shifting of any of the clutch means 78, 80 or 82 by their respective shift forks 614 while the transmission is in neutral, reverse, first and second speeds. This means comprises a hydraulically actuated piston 630 which extends upwardly in the control cover 517 to abut against the furthest right one of a series of interlocks disposed in a channel 631 formed in the control housing 517. Positioned in abutting relation with the piston 630 is a first channel interlock 632 with channel interlocks 634 and 636 being positioned leftwardly in channel 631. To the left of each of the channel interlocks 632, 634 and 636 a pin interlock 638 is provided. Each of the pin interlocks 638 is disposed for linear movement in a channel 640 formed transversely in the piston shafts 594 and coaxial with channel 631 when the piston shafts 594 are in their neutral position. The opposing ends of channels 640 are provided with enlarged chamfered portions 642 into which tapered ends 644 of interlocks 632, 634 and 636 may be received and engaged, preventing up or down movement of the piston shafts 594 of the pneumatic actuators.

The hydraulic piston 630 is spring biased upwardly into a cam engagement with interlock 632, thereby shifting interlocks 632, 634, and 636 to the left as shown in FIG. 10, by a spring means 646 disposed within the housing for the hydraulic piston 630 and engaging a lower shoulder 648 on the piston. When interlocks 632, 634 and 636 are moved to the left, pin valve 650 in channel 631 is also moved to the left against the biasing action of the spring 652 in the left end of the channel. The pin valve 650 provides a "neutral" signal as will be explained hereinafter.

A hydraulic conduit 649 is attached to and communicates with a chamber 628 containing the piston 630 at a location above a piston head 629 of the hydraulic piston 630. Hydraulic pressure from conduit 649 may be applied to act against the spring means 646 to force the piston head 629 downwardly to release the interlocks 632, 634 and 636 for linear movement to the right to permit movement of shafts 594. The hydraulic conduit 649 may extend to the pneumatic plungers 110 and 111 and be pressurized thereby in response to or upon retractive movement of the pneumatic plungers 110 and 111.

Upon interlock release by hydraulic piston 630, the interlocks 632, 634 and 636 and pin interlocks 638 move rightwardly under the urging of the pin valve 650 which is biased in this direction by the resilient spring 652 disposed in nested relationship within the channel 631. The interlocks 632, 634, and 636 and pin interlocks 638 are stopped in an aligned position to permit upward and downward movement of shafts 594, when interlock 632 abuts against upper portion 630a of piston 630 which is reduced in diameter to effect the aligning action. However, movement of any of the shafts 594 up or down to move its associated toothed clutch means actuates the interlock system to then prevent movement of the other two shafts up or down. Movement of a piston shaft and shift fork out of "neutral" position pushes pin valve 650 back to the left to signal that the transmission is no longer in neutral.

A similar series of interlocks 632a, 634a and 636a are provided for sensing the positions of pistons in actuators 534, 536 and 538 and providing a "neutral" signal via pin valve 650a (see FIG. 3B) for toothed clutch means 72, 74 and 76. Again, movement of one of the shafts 594 out of "neutral" position prevents movement of the other two actuator shafts from "neutral."

The hydraulic control system 192 for the transmission 10 will now be described with particular reference to FIGS. 3A and 3B. A pump 672 drawing oil from a sump 674 provides pressurization for the hydraulic control system 192, all of which may be conveniently located in the transmission housing 12. A filter 676 and cooler 678 disposed immediately downstream of the pump 672 receive the pressurized oil from the pump to clean and cool the oil. A conduit 680 leading from the oil cooler 678 supplies oil pressure for operation of the remainder of the system and branches into a pair of conduits 682, 684. Conduit 682 provides oil flow via the valving action of pneumatic plungers 110 and 111 to release the interlocks for clutches 78, 80 and 82 and supplies oil flow via supply valve 395 to the pin valves 650, 650a to provide oil pressure for a "neutral" signal. Conduit 684 provides oil flow to the primary side of hydraulic control system 192.

Plungers 110 and 111 are secured to piston rods 911 and 931 attached to pistons 912 and 932 in two-way acting pneumatic actuators 910 and 930. A supply line 902 supplies air under pressure from an air supply tank via an air pressure regulator 903 to the piston cylinders 913 and 933 of actuators 910 and 930 to act on the piston heads 914 and 934 facing away from plungers 110 and 111. As seen FIGS. 3B and 9, a channel 540 connected to the port 486, and thus to the pressurized chamber 449 in valve housing 382, supplies air under pressure to the piston cylinders 913 and 933 of actuators 910 and 930 via conduits 544, 542 to act on the piston heads 915 and 935 facing plungers 110 and 111, respectively.

Since the areas of the piston head faces 915 and 935 are larger than the piston head faces 914 and 934, the application of substantially equal air pressures to opposing piston head surfaces in the actuators 910 and 930 will result in the movement of the pistons 912 and 930 will result in the movement of the pistons 912 and 932 away from ring gear 96 and the retraction of plungers 110 and 111 from engagement with detents 112, permitting rotation of ring gear 96.

However, when the bore 460 of valve 202 is positioned over port 486 when the transmission is in reverse, neutral, first or second, air is exhausted from the inner sides of the cylinders 913 and 933 of actuators 910 and 930 through channels 544, 542. Pressure on the piston heads 914 and 934 of the pistons 912 and 932 will cause the pistons to move the attached plungers 110 and 111 to an engaged position with ring gear 96, preventing rotation thereof.

Piston rods 911 and 931 are slidably mounted in cylinders 924 and 944, respectively. Piston rod 911 has an outer land area 921 and an inner land area 922 connected by a stem portion 923 and piston 931 has an outer land area 941 and an inner land area 942 connected by stem portion 943. When the plungers 110 and 111 are in their extended and engaged position as shown in FIG. 3B (reverse, neutral, first or second), outer land area 921 blocks the flow of oil from conduit 682 into the cylinder 924 and land area 942 blocks the entrance of a conduit 683 into cylinder 944. A vent 945 in the cylinder 944 now lies between outer and inner lands 942 and 941 and is open in response to the extended position of rod 931 (land area 941 being moved from a vent blocking position) to permit oil flow therethrough to the sump from the cylinder 944, conduit 649, and the cylinder 628 containing interlock piston 630. The venting and subsequent oil pressure drop on the upper portion of hydraulic piston 630 allows spring 646 to urge piston 630 into a position which activates interlocks 632, 634, 636 which force pin valve 650 outwardly and prevent it from providing a false neutral signal at this time as all the clutch means 78 to 82 on the countershaft 18 are neutralized when the transmission is in reverse, first and second. Valve 650 is also prevented from providing a neutral signal when the transmission is in neutral, since at this time, all the clutch means 72 to 76 are disengaged and pin valve 650a will provide a neutral signal.

In response to shifting out of all of the reverse, neutral, first and second speeds, port 486 of valve 202 is uncovered and air pressure flows from chamber 449 through conduits 544 and 542 and forces pistons 912 and 932 outwardly thereby causing the plungers 110 and 111 to retract and withdraw the blocking action of land areas 921 and 942. Oil then flows from conduit 682 through cylinder 924, around the stem 923 and into conduit 683, cylinder 944 around stem portion 943, and then into conduit 649 to apply pressure on the upper side of piston 630 and move it downwardly from its interlock engaged position. Land area 941 in the cylinder 944 now blocks vent 945 at this time.

Still referring to FIGS. 3A and 3B, it may be seen that the hydraulic supply valve 395 (FIG. 7) is connected between a conduit 682a, branching from conduit 682, and a conduit 682b leading to pin valves 650 and 650a. Pin valve 650, which in FIG. 3 is shown in its closed position, opens to permit passage of oil therethrough in response to all of toothed clutch means 78, 80 and 82 being in a disengaged or neutral position and the interlock piston 630 being in a disengaged or noninterlocking position. That is, land 651 of valve 650 is moved out of blocking position in front of conduit 682b, from supply valve 395, by the action of spring 652, so that conduits 682b and 682c become confluent.

Pin valve 650a opens for passage of oil in response to toothed clutch means 72, 74, and 76 all being in neutral or disengaged positions. That is, land 651a of valve 650a is moved out of blocking position in front of conduit 682b, from supply valve 395, by the action of spring 652a when toothed clutch means 72, 74 and 76 are in disengaged positions so that conduits 682b and 682c are confluent. The action is permitted in the same manner as described hereinbefore with respect to valve 650 and toothed clutch means 78, 80 and 82.

The opening of either valve 650 or 650a permits oil flow from conduit 682b around reduced diameter stems to conduit 682c which is connected to conduit 682d to provide a "-neutral" signal to the primary side of the hydraulic control system.

As explained hereinbefore, valve 395 is open only when the left portion 390 of the piston rod of the linear actuator 196 indicates that the transmission is in one of the second through eleventh speeds. Therefore, oil may not flow through supply valve 395 from conduit 682a to conduits 682b to supply either of the pin valves 650, 650a when the transmission is in reverse, first or neutral speeds. Thus, a "neutral" signal may not be supplied to conduit 682d when the transmission is in reverse, first or neutral speeds or when shifting between such speeds. When upshifting to second speed, pin valve 650 is held to the left or in a closed position by the interlock piston 630 since the ring gear 96 is being held stationary, however pin valve 650a and valve 395 are open at this time and provide the desired "-neutral" signal. While, when upshifting from second speed and up to 10th speed and piston 630 is down and pin valve 650 may provide a neutral signal whenever all the actuators 528, 530 and 523 are "neutralized."

Referring again to the primary side of control system 192, as illustrated in FIG. 3A, it may be seen that conduit 684 leads directly to a manually operated clutch valve 686 which is a variable pressure regulator, the pressure regulation by this valve being governed by the position of the clutch pedal 695a that may be foot operated by the vehicle driver. Clutch valve 686 includes a plunger 687 disposed in a bore 694 formed in housing 12, which plunger has a right land 688 and a left land 690 rigidly connected by a reduced stem portion 692.

The conduit 684 also continuously supplies oil pressure to a conduit 702 which is aligned therewith and extends from the bore 694 of the valve 686 to the bore 704 of a primary pressure regulator valve 706. The bore 694 is enlarged at 694a which is at the junction of the conduits 684 and 702 with the bore 694, so that regardless of the position of the plunger 687, conduits 684 and 702 remain confluent.

The primary pressure regulator valve 706 is a bypass pressure regulator and controls the oil pressure which is available at the enlarged portion 694a of the bore 694 and bypasses excess oil through a conduit 720. More particularly, the valve 706 has a bore 704 containing a plunger 708 having space lands 712 on the left and 718 on the right connected by a reduced stem portion 713. The land 712 is engaged at its left end by a compression spring 710 which is compressed between the land and an adjustable screw means 714 carried in the left end of the bore 704. The pressure exerted by spring 710 upon the plunger 708 and thereby the pressure regulating action thereof can be adjusted by the screw means 714.

A conduit 716 is confluent with the conduit 702 and leads to the right end of the bore 704, so that the pressurized oil therein may react against the right end of land 718; which land, even with plunger 708 displaced completely to the right, will be spaced from the end of bore 704 by a projection 718a on the right side of the land. Accordingly, as the pressure in enlarged portion 694a and conduit 702 builds up, this pressure, through conduit 716, reacts against the right side of land 718 of plunger 708 and urges the same to the left against the force of the spring 710. As plunger 708 moves to the left, land 712 thereof uncovers conduit 702 and allows oil to flow into the bore 704 between lands 712 and 718, from where it can flow out of a conduit 720 which is positioned so as to always be confluent with bore 704 between lands 712 and 718. Contrarily, as pressure in the enlarged portion 694a starts dropping, the pressure through conduit 716 to the right end of plunger 708 reduces and spring 710 moves the plunger 708 to the right so that land 712 covers the conduit 702 and reduces or even stops the flow of oil therethrough until the pressure in conduit 702 again builds up to the level required to bias plunger 708 to the left to open conduit 702. The oil pressure in enlarged portion 694a may be set at any suitable level by adjusting the screw means and pressures of 60 p.s.i. have been used satisfactorily.

Conduit 720, bypassing oil from valve 706, is confluent with a lube conduit 737 which conducts oil to various portions of the transmission for lubricating purposes. Additionally, the conduit 720 extends to an oil pressure regulating valve 730, which is a bypass regulator valve for controlling the pressure of the lubricating oil flow in conduit 737. More particularly, the valve 730 has a bore 728 in which is received a plunger 734 having left and right lands 733a and 733b, respectively, connected by a reduced stem portion 733c. A compression spring 732 is compressed between the left end of bore 728 and the land 733a and urges plunger 734 to the right; in which position land 733a covers conduit 720 and prevents oil therefrom from entering bore 728. A conduit 736, confluent with the conduit 737, is also confluent with the right end of bore 728 and oil pressure therefrom acts upon the right end of land 733b and urges the plunger 734 to the left against the urging force of the springs 732. When the pressure is sufficient to overcome spring 732, the land 733a will move to the left and open conduit 720 so that oil may flow into bore 728 between lands 733a and 733b from where it may flow out of the bore 728 through a conduit 738; the latter conduit being continuously confluent with the bore 728 between lands 733a and 733b. Accordingly, valve 730 controls the pressure of the oil flowing into the conduit 737 and bypasses excess oil through conduit 738. The spring 732 is chosen to give desired pressure in the conduit 737, and pressures of 30 p.s.i. have been found satisfactory.

The conduit 738 leads to a clutch cool valve 740 and is confluent with an intermediate location of a bore 742 thereof. A plunger 744 is disposed in the bore 742 and has spaced left and right lands 743 and 758 connected by reduced stem portion 745, and has an elongated stem portion 757 extending rightwardly from the land 758. With the stem 757 engaging the right end of the bore 742, a vent conduit 760, extending to sump, is confluent with the bore 742 to the right of land 758, the conduit 738 is confluent with the bore 742 immediately to the left of the land 758, a conduit 746, extending to the clutch means 130 for clutch cooling purposes, is confluent with the bore 742 immediately to the right of land 743, a vent conduit 740a, l extending to the sump, is confluent with the bore 742 at a location which is blocked by land 743, and a conduit 762, extending from the bore 694 of valve 686, is confluent with the left end of the bore 742. In this rightward position of the plunger 744, bypass oil from conduit 738 enters the bore 742 between the lands 743 and 758 and exits from the bore 742 through the conduit 746 and is conducted therethrough to the clutch 130 for cooling purposes.

A coiled compression spring 756 engages the right side of land 758 and the right end of the bore 742 and receives therein the stem 757. The spring 756 urges the plunger 744 to the left against the oil pressure in the left end of the bore 742 entering the latter from the conduit 762 to react against the left side of the land 743. With no oil pressure in the left end of the bore 742, the plunger 744 moves completely to the left until a small projection 764 on the left side of the land 743 engages the left end of the bore 742. At this time bypass oil from valve 730 enters the bore 742 from the conduit 738 to the right of the land 758 and flows out of the bore 742 through the sump vent 760. Additionally, the land 743 moved to the left of the sump vent 740a, while conduit 746 is confluent with the bore 742 between the land 743 and 758 and any oil in the line 746 may vent to sump via conduit 740a thereby terminating all flow of clutch cooling oil to the clutch 130.

Returning now to the manually operated clutch valve 686, with the plunger 687 thereof disposed substantially all the way to the right in the bore 694, as shown in FIG. 3A, the left side of the right land 688 is positioned rightwardly of the leftward termination of the enlarged portion 694a, so that oil may enter the bore 694 to the left of the land 688. A pair of conduits are confluent with the bore 694 between the lands 688 and 690; the conduit 762 leading directly to the left end of the bore 742 of clutch cool valve 740, and a conduit 766 leading to several valves and from the latter ultimately to the clutches 136 and 138 as hereinafter described.

A vent conduit 766a, extending to the sump, enters the bore 694 at a position which at this time is blocked by the left land 690; which vent conduit is adapted to vent the bore 694 when such is uncovered by the land 690. The vent conduit 766a also is confluent with the left end of the bore 704 of the valve 706 which in turn is connected to the left end of the bore 728 of the valve 730 by means of a conduit vent 766b. The vent 766a can thus always vent any oil from the left ends of bores 704 and 728 which may inadvertently leak past the plungers therein.

A conduit 768 is confluent with the conduit 766 at a location immediately adjacent to the bore 694 and extends to the right end of the bore 694 so that the oil pressure therein can react on the right end of the land 688 to urge the plunger 687 to the left; the pressure of the oil in the conduit 768 reflecting the pressure of the oil in conduit 766.

A coiled compression spring 700 in the bore 694 engages the left end of the land 690 and the right end of a plunger 696 mounted in the left end of the bore for relative axial movement. A stem 695, secured to the plunger 696, extends through the left end wall 698 of the bore 694 and through the housing 12 where it is pivotally secured to a linkage rod L which extends to and is pivotally secured to the lower end of a clutch pedal 695a. Pedal 695a is pivotally mounted intermediate its ends at P to a stationary portion M which is conventionally located in the vehicle adjacent the driver's position. A stop R is adapted to engage the portion of the pedal 695a below the pivot P and on the rightward side thereof to inhibit counterclockwise movement of the pedal beyond this point and also serves, through the operation of the linkage L, to limit the full engaged or full right position of the plunger 696.

A tension spring S is secured to the portion M rightwardly of the pivot P, with the left end thereof secured to the lower portion of the pedal 695a thereby to constantly urge the pedal counterclockwise. Manual movement of the clutch pedal 695a to its disengaged position is accomplished upon manually initiated clockwise rotation thereof. This moves the rod L and the plunger 696 to the left until the plunger engages the left end wall 698 of the bore 694 in its fully disengaged position. Intermediate disengaged positions can be accomplished by manually maintaining the clutch pedal 695a at its desired location.

When the plunger 696 is full right, as seen in FIG. 3A, the spring 700 is compressed against the plunger 687 and attempts to urge the same full right, but is counteracted by the oil pressure at the right end of the bore 694. The spring 700 is chosen so that, at this time, with 60 p.s.i. pressure in the bore 694 and the conduit 766 in the plunger 687 will be spaced from the right end of the bore 694 an amount sufficient to place the left side of the land 688 partially across the enlarged portions 694a of the above 694. If the pressure in conduit 766 drops somewhat, for example, as a result of downstream demand, the pressure on the right end of the plunger 694 will be reduced and the plunger will move farther right to allow a greater volume of oil to enter the bore 694. Contrarily, if the pressure in conduit 766 builds up, valve 706 will maintain the supply thereof at the enlarged portion 694a at 60 p.s.i. and also, the pressure on the right end of the plunger 694 will urge the same to the left against the force of the spring 700 to close the enlarged portion 694a from the bore 694.

Upon depression of the pedal 695a to its disengaged position, the plunger 696 moves simultaneously to the left thereby reducing the compressive forces on the spring 700. A small pressure at the right end of the bore 694 from the conduit 766 is now capable of moving the plunger 687 to the left sufficiently to close the enlarged portion 694a. At full disengagement, the spring 700 is compressed such a small amount that substantially zero pressure in conduit 766 will force plunger 687 to the left so that land 688 closes the enlarged portion 694a from the bore between lands 688 and 690, and moving land 690 to the left of the vent 766a. In this position, the bore between land 688 and 690 will be connected to the vent 766a and conduit 762 and 766 will be vented to substantially zero pressure.

Venting of the conduit 762, vents the left end of the bore 742 of the clutch cool valve 740 and allows the spring 756 to bias plunger 744 of the valve 740 to the left so that the conduit 738 is connected to the vent conduit 760 and no longer is confluent with the conduit 746 supplying clutch cooling oil, and no cooling oil enters the clutch to provide drag when the pedal 695a is moved to disengagement.

As the pedal 695a is released, the spring 700 is compressed, thereby biasing plunger 687 to the right and pressure builds up in conduit 766 and 762. Conduit 766 can, therefore, supply controlled pressure to cause the engagement of the clutches 136 and 138 and the pressure in conduit 762 moves the plunger 744 to the right to supply cooling to the clutches during engagement and when the clutches are engaged.

The conduit 766 extends to and is confluent with the medial portion of a bore 774 of the alternator valve 748. A plunger 776 is disposed in the bore 744 and has a left, center and right land 778, 780 and 782, respectively; lands 778 and 780 being connected by a reduced stem 788a, and lands 780 and 782 being connected by a reduced stem 789. A stem 814 extends from the left end of the land 778 and is adapted to engage the left end 786 of the bore 774 to limit leftward movement of the plunger 776. A coil spring 784 engages the left bore end 786 and the left end of land 778 and urges the plunger 776 to the right.

A chamber 808 is disposed in the housing 12 immediately to the right of the bore 774 and has a piston 810 disposed therein. A piston rod 812 secured to the piston 810 extends to the left therefrom through the left wall of the chamber 808, and with the piston 810 disposed full right as shown in FIG. 3A, the left end of the rod 812 projects slightly into the bore 744 where it is abutted by the right end of land portion 782 of the plunger 776.

The previously described conduit 806 from the ball check valve 516 enters the right end of the chamber 808 and, upon the venting of any of the ports 486 to 508 of cylinders 528 to 538, the vented air pressure enters the chamber 808 and forces the piston 810 to the left until it reaches the left end of chamber 808. A vent conduit 834 in the chamber 808 is positioned so that when piston 810 moves full left, it vents the portion of the chamber to the right of the piston 810. Movement of the piston 810 to the left moves the plunger 776 to the left along therewith, and the venting of the chamber 808 allows the piston 810 to be returned to the right.

Means in addition to the piston 810 are available to impose a force on the right side of the land 782. The conduit 682d is supplied by oil from pin valves 650 and 650a at such times as the various interlocks allow them to open and to supply a neutral signal. Conduit 682d is confluent with the right end of bore 774 and the oil pressure therein will exert a sufficient force on the right side of the land 782 to maintain the plunger 776 to the left against the biasing effect of the spring 784. A vent 682e leading to the sump is confluent with the conduit 682d adjacent to the valve 748. When the conduit 682d is supplied with oil pressure by valve 650 and/or 650a, vent 682e is insufficient to vent the conduit to the extent that the plunger 776 is not urged to the left. When the supply of pressure to conduit 682d is terminated, the vent 682e is sufficient to rapidly reduce the pressure to the right of land 782 so that the spring 784 biases and retains the plunger to the right against the left end of the piston rod 812.

Thus, upon venting any of the cylinders 528 to 538, the charge of vented air pressure reaches chamber 808 through conduit 806 and forces piston 810 and plunger 776 to the left. When the piston 810 passes to the left of vent 834, the chamber 808 to the right of piston 810 is vented and, absent other considerations, spring 784 will bias plunger 776 and piston 810 back to then rightward position. When shifting into any of the speeds second through 11th, valve 395 will be open and supply oil pressure through conduit 682b to pin valves 650 and 650a and one of these pin valves, depending on the cylinder 528 to 538 being actuated, upon the interlocks associated therewith indicating neutral condition, will open and pass oil pressure to conduit 682d. The oil pressure in conduit 682d will enter bore 774 and retain plunger 776 to the left in the position wherein it was placed by the leftward movement of the piston 810, after chamber 808 vents through vent 834.

Three exit conduits are available for oil which enters bore 774 of valve 748 from conduit 766. A conduit 828 connects to the bore 774 to the left of the conduit 766, and with the plunger 776 full right, as shown in FIG. 3A, is immediate to the right of the land 778. A second conduit 790 is opposed to the conduit 766 and with the plunger full right, conduits 766 and 790 are located immediately to the left of the land 780. A third conduit 816 connects to the bore 774 at a position which, regardless of the position of plunger 776, is intermediate the lands 780 and 782. With the plunger 776 full right, a vent conduit 817a connects to the bore 774 immediately to the left of the land 782, and a vent 832a is disposed in the bore at a position which is blocked at this time by the land 778. The vent 832a is connected to a valve 1210 which can connect the vent 832a to the sump or to the lubrication conduit 737.

More particularly, the valve 1210 has a bore 1215 therein receiving a plunger 1211 having upper and lower lands 1212 and 1213 connected by a reduced stem 1214. A spring 1218 is disposed in the upper part of the bore 1215 and abuts the upper end wall 1217 and the upper end of the land 1212, thereby urging the plunger 1211 downwardly toward the lower end wall 1216 of the bore 1215. A conduit 1200 connects to the vent 832a and is confluent with the bore 1215 at a position immediately below the land 1212 when the plunger 1211 is downwardly. At this time, conduit 1201 is confluent with the bore 1215 between the lands 1212 and 1213 and, therefore, is confluent with the conduit 1200 and the conduit 1201 extends to connect with the lubrication conduit 737.

A vent conduit 1219 connects to the bore 1215 at a position immediately above land 1212 when plunger 1211 is downwardly. Upward movement of plunger 1211 results in land 1213 covering conduit 1201 and conduits 1200 and 1219 becoming confluent such that conduit 1219 vents bore 1215 and conduit 1200, and the conduit 1219 then connects vent 832a to the sump.

A conduit 1240 connects the lower end of bore 1215 of valve 1210 to a pilot air valve 1230 carried by the valve housing means 382 (see FIGS. 3B, 7 and 8). Valve 1230 is disposed in axial alignment with hydraulic supply valve 395 and actuates the valve 1210. The valve 1230 includes a piston 1231 disposed in a bore 1232 having top and bottom end walls 1233 and 1234 respectively. A piston rod 1235 extends from the piston 1231 through the bottom end wall 1234 and contacts the top of the rod 197 of linear actuator 196. The top of piston rod 197 has a pair of axially spaced camming notches 1236 and 1236a therein separated by the intermediate surface 1237 of the rod 197; the intermediate surface being higher than the notches 1236 and 1236a. Notch 1236 is axially elongated and is adapted to engage the lower end of piston rod 1235 when the rod 197 is in its reverse, neutral and first speed position. Upon rod 197 moving to its second speed position, the piston rod 1235 is cammed upwardly to the upper intermediate surface 1237 of rod 197. When in the direct drive position of the rod 197, the notch 1236a is disposed below the piston rod 1235 and the piston rod 1235 enters the notch and moves to its lower position.

A conduit 1238 connects to conduit 604, the latter being connected to the air supply 603 by conduits 602 and 902. The conduit 1238 is connected to the bore 1232 through the top wall 1233. The conduit 1240 is connected to the bore 1232 intermediate the ends thereof, while an atmosphere vent conduit 1239 is connected adjacent the lower end 1234 of the bore 1232. With the rod 197 in its first speed, neutral, reverse position, or direct drive position, notches 1236 or 1236a are below the lower end of the piston rod 1235 and air pressure above piston 1231 biases the latter downwardly until piston rod 1235 enters notches 1236 or 1236a. Conduits 1238 and 1240 at this time are confluent and air pressure flows through conduit 1240 to valve 1210 and biases the plunger 1211 upwardly to connect line 1200 and vent 832a to the sump conduit 1219. With the rod 197 in its second to 10th speed positions, the intermediate portion 1237 of rod 197 holds the piston rod 1235, and thus piston 1231, upwardly and piston 1231 is disposed between conduits 1238 and 1240 and blocks the same, while conduit 1240 and the vent 1239 are on the lower side of piston 1231 and conduit 1240 is vented. This vents the lower end of valve 1210 and the plunger 1211 moves downwardly connecting conduit 1200 and vent 832a to the lubrication conduit 737 carrying lubricating oil at 30 p.s.i.

Referring again to the three exit conduits 828, 790 and 816 from the bore 774 of valve 748, these lead to a pair of overlap or lag valves 750 and 752. The valve 750 has a bore 792 which receives a plunger 794 having spaced left and right lands 796 and 798 connected by a stem 800 of reduced diameter. A stem 801 extends to the left from the land 796 and is adapted to engage the left end wall 803 of bore 792 to limit the leftward movement of the plunger 794. A compression spring 802 engages the wall 803 and the left side of land 796 to urge the plunger 794 to the right. The right side of land 798 has a small projection 799 thereon adapted to engage the right end wall 803a of bore 792 to limit the rightward movement of plunger 794 and maintain land 798 always spaced from the wall 803a. The right end portion of bore 792 is enlarged at 824 so that the diameter thereof is larger than land 798.

The valve 752 includes a bore 820 receiving a plunger 860 having spaced left and right lands 866 and 862 connected by a reduced diameter stem 863. A stem 865 extends to the right from land 862 and is engageable with the right end wall 867 of bore 820 limiting the rightward movement of plunger 860. A compression spring 864 engages the right wall 867 and the right side of land 862 to urge the plunger 860 to the left. The left side of land 866 has a small projection 869 thereon engageable with the left end wall of bore 820 to limit leftward movement of plunger 860 and maintain land 866 always spaced from the left end wall. The left end portion of bore 820 is enlarged at 868 so that the diameter thereof is larger than land 866.

The conduit 790 is confluent with the bore 820 at a position intermediate the ends thereof and, with the plunger 860 positioned to the right, as shown in FIG. 3A, the land 866 blocks the conduit 790 from the bore 820; however, the bore 820 has an enlarged portion 791 at the location of the conduit 790, and a conduit 790a, which is opposed to the conduit 790 and enters the enlarged portion 791, remains constantly confluent with the conduit 790. When the plunger 860 moves to the left, the conduit 790 becomes confluent with the bore 820 between the lands 866 and 862.

The conduit 816 enters bore 820 at a location which, when the plunger 860 is rightwardly, is confluent with the bore 820 between lands 866 and 862, and when the plunger 860 is leftwardly, the conduit 816 is blocked by the land 862. A conduit 822 exits from bore 820 at a position which is always intermediate the lands 862 and 866 and, therefore, is always confluent with the portion of the bore 820 between said lands. The conduit 822 enters the enlarged portion 824 of valve 750 and is constantly confluent with a conduit 826 which exits from the enlarged portion and extends to the direct drive clutch 136 wherein it opens into the annular groove 1114, so that when oil pressure is present in conduit 826, the same enters groove 1114 to react on pressure plate 1110 and cause engagement of clutch 136.

As pressure builds up in groove 1114, it also builds up in the conduit 826 and the enlarged portion 824 of the bore 792 of the valve 750 and acts upon the right end of land 798 to force the plunger 794 to the left against the bias of spring 802.

The conduits 790a and 828 enter the bore 792 of valve 750 at locations such that, when plunger 794 is rightwardly, conduit 790a is confluent with bore 792 between lands 796 and 798, while conduit 828 is blocked by land 796, and, when the plunger 794 is leftwardly, the conduit 790a is blocked by the land 798 and the conduit 828 is confluent with the bore 792 between the lands 796 and 798.

A pair of opposed conduits 804 and 804a are confluent with the bore 792 at a location which is always intermediate the lands 796 and 798. The conduit 804 leads to the gear clutch 138 wherein it opens into the annular groove 1124, so that when oil pressure is present in conduit 804, the same enters groove 1124 to react on pressure plate 1120 and the plurality of pistons 1150 and cause engagement of clutch 138.

As pressure builds up in groove 1124, it also builds up in the conduits 804 and 804a. The conduit 804a is confluent with the enlarged portion 868 of the bore 820 and oil pressure in conduit 804a enters the enlarged portion of 868 and acts upon the left end of land 866 to force the plunger 860 to the right against the bias of spring 864.

The hydraulic control system 192 also includes an upshift-downshift valve 754 having a bore 840 therein receiving a plunger 754a having spaced land portions 754a and 754c connected by a reduced diameter stem portion 754d. A pair of conduits 836 and 836a enter the bore 840 and, when the plunger 754a is leftward as shown in FIG. 3A, land 754c blocks conduit 836a, while when plunger 754a moves rightwardly, conduits 836 and 836a become confluent with the bore 840 between the lands 754b and 754c.

Conduit 836 is confluent with conduit 804 and becomes charged with oil pressure when the conduit 804 is charging the gear clutch 138. Conduit 836a leads from the valve 754 to the left end of the bore 792 of the valve 750. A vent 792a is also confluent with the left end of bore 792. Oil pressure entering the bore 792 from conduit 836a combines with the spring 802 in urging the plunger 794 rightwardly so that when pressure is present in the enlarged portion 824 of bore 792, such cannot force the plunger 794 to the left against both the spring 802 and oil pressure from the conduit 836a. While the vent 792a is constantly open, its venting capacity is such that, while it will not prevent the oil pressure from conduit 836a from being effective, it will rapidly vent the left side of bore 792 immediately upon termination of oil pressure supply from the conduit 836a.

Upshift or downshift signals are supplied to valve 754 to move plunger 754a between its leftward and rightward position. A pair of conduits 755a and 755b are confluent with the right and left end respectively of bore 840. The conduit 755a is connected to the right end of the bore 352 of actuator 196 at a port 755c while the conduit 755b is connected to the left end of bore 352 at a port 755d (the ports are shown in FIG. 7). When air pressure is vented from the left end of bore 352 during an upshift, pressure is also vented, through the conduit 755b, from the left end of bore 840 and the higher pressure in the right end of bore 352, conducted by conduit 755a, is present in the right end of bore 840 and moves the plunger 754a of valve 754 to the left. During a downshift, the pressures are opposite to that just described, and the plunger 754a moves to the right.

Accordingly, during a downshift, valve 754 supplies oil pressure from the conduits 804 and 836 through the conduit 836a to the left end of bore 792 of valve 750. The plunger 754a remains in its leftward position until a downshift is made to move it to the right, and remains in its rightward position until an upshift is made to move it to the left.

Operation —Neutral to First Speed

Commencing from neutral, to place the transmission into first speed, the operator depresses the clutch pedal 695a moving the plunger 696 of valve 686 full left. The plunger 687 of valve 686 then moves left as a result of the decreased load on spring 700 and the urging of oil pressure on the right end of land 688 from conduits 768 and 766. The land 688 then blocks conduit 694a from bore 694 of valve 686 and land 690 opens vent 766a. The conduit 766, supplying the valves 748, 750 and 752 and the clutches 136 and 138, and also the conduit 762, which extends to the left end of bore 742 of valve 740, are both vented. Both the clutches 136 and 138 become disengaged and the plunger 744 of valve 740 moves to the left directing the clutch cooling oil to the sump through conduit 760 and venting the clutch cooling oil conduit 746 through vent 740a. The operator simultaneously moves shift lever 238 of selector valve 194 to its first speed position which vents servocylinder 196 through aperture 396 so that the piston means 350, including rod 197, moves to the left and the double rack gear portion thereof moves selector valve 200 clockwise to a position wherein port 498 is vented. Port 498 then vents the top of pneumatic actuator 534 through conduit 558 and the latter shifts the clutch means 72 rightwardly to engage the gear 52 in driving connection with the shaft 16.

Since this is first speed, the selector valve 202 remains positioned over the port 486, venting conduits 540, 542 and 544, so that pistons 912 and 932 are inwardly and both the plungers 110 and 111 are engaged with the detents 112 on ring gear 96. The land 921 of piston rod 911 blocks conduit 682 and the land 942 of piston rod 931 blocks the conduit 683, while the conduit 649 is vented through the vent 945 and the interlock piston 630 remains upwardly. This keeps the pin valve 650 to the left so that the land 651 blocks the conduit 682b from conduit 682c. Since the clutch means 72 is in an engaged position with the gear 52, the pin valve 651a is also to the left blocking the conduit 682b from the conduit 682c. Thus no neutral signal is being obtained in conduit 682d leading to the alternator valve 748.

The air pressure vented from the port 498, when the top of the actuator 534 was vented, passed through the conduits 512 and 806 and into the chamber 808 and forced piston 810 to the left; the latter forcing plunger 776 of valve 748 to the left. When the piston 810 moves leftwardly of the vent 834, the chamber 808 starts venting and, since there was no neutral signal in the conduit 682d, upon venting of the chamber 808, the spring 784 immediately commences returning the plunger 776 to the right as the pressure in chamber 808 drops. Previous to the plunger 776 moving rightwardly, the land 778 thereof will be to the left of the conduit 832a and the latter at this time is connected by the conduit 1200 to the vent conduit 1219 through the valve 1210. Accordingly, at this time, the supply conduit 828 will be venting through the vent 832a. When the plunger 776 returns to the right after the venting of chamber 808, the conduit 828 vents through the conduit 766.

With the clutch means 72 engaged with the gear 52 and the transmission shifted into first speed, the operator now releases the clutch pedal 695a moving the plunger 696 to the right and spring loading the plunger 687 to the right. The land 688 of plunger 687 unblocks the conduit 694, while the land 690 blocks the vent conduit 766a. Oil pressure enters the bore 694 between lands 688 and 690 and flows into the conduits 762 and 766. From the conduit 762, oil pressure enters the left end of the bore 742 of valve 740 and moves the plunger 744 to the right so that clutch cooling oil is now directed to the clutch means 130 through the conduit 746.

Since the valve 748 is rightwardly, the oil pressure in the conduit 766 flows through the bore 774 between the lands 778 and 780 and out of the bore 774 through the conduits 828 and 790. The plungers 794 and 860 of valves 750 and 752, respectively, are both, at the instant when pressure is first introduced, in their spring biased position, with the plunger 794 to the right and the plunger 860 to the left. The entrance of conduit 828 to the bore 792 of valve 750 is closed by the land 796, while the conduits 790 and 790a are open, respectively, to the bores 820 and 792 of the valves 752 and 750.

Oil pressure flows outwardly from the bore 820 of valve 752 into the enlarged portion 824 of the bore 792 and from the latter through a conduit 826 to the annular groove 1114 of the clutch means 136 to commence engaging the same. As pressure builds up in the groove 1114, it also builds up in the enlarged portion 824 and biases the plunger 794 to the left.

Prior to the plunger 794 being biased to the left, the bore 792, between the lands 796 and 798, was supplied by oil pressure from the conduit 790a, which pressure flowed from the bore 792 through the conduit 804 to the annular groove 1124 of gear clutch 138, and also through the conduit 804a to the enlarged portion 868 at the left of the bore 820 of valve 752 wherein it biased plunger 860 to the right. When plunger 794 of valve 750 is biased to the left, the land 798 closes the supply conduit 790a from the bore 792, while land 796 moves to the left of the conduit 828 (which at this time is a supply conduit since the plunger 776 of valve 784 is rightwardly) and, oil pressure is now supplied to the bore 792 and from the latter to the conduits 804 and 804a.

Accordingly, in this stage of operation, whether the plunger 794 is positioned to the right or left, the valve 750 supplies oil pressure through the conduit 804 to the clutch 138 and through the conduit 804a to the left end of the valve 752.

As the oil pressure builds up in the clutch 138, it also builds up in conduits 804 and 804a and in the enlarged portion 868 of valve 752, wherein it biases the plunger 860 to the right. The land 866 then closes the supply conduit 790 from the bore 820, while the land 862 moves to the right of conduit 816 leading to the bore 774 of valve 784 and the bore 820 of valve 752 becomes vented through the conduit 816, the bore 774 and the vent conduit 817a. The venting of bore 820 also vents the conduit 822, the enlarged portion 824 at the right end of the bore 792, the conduit 826 and the direct drive clutch 136. With the enlarged portion 824 vented, the plunger 794 returns to the right, in which position the bore 792 is now supplied with oil pressure from conduit 790a, and conduits 804 and 804a remain charged. Since this is an upshift, plunger 754a of valve 754 remains leftward and no oil pressure enters conduit 836a at this time.

First Speed to Second Speed

To shift from first to second speed, the operator needs not manipulate the clutch pedals 695a, but merely moves the selector valve 194 to its second speed position, which vents the servocylinder 196 through the aperture 398 so that the piston means 350, including the rod 197, moves to the left thereby moving selector valve 200 clockwise to a position wherein previously vented port 498 is uncovered and becomes charged and, subsequently, port 500 becomes vented.

Since this is an upshift to second speed, the selector valve 200 remains positioned over the port 486, as it was in neutral and first speed, and the plungers 110 and 111 remain engaged with the detents 112 on the ring gears 96. Additionally, interlock piston 630 remains upwardly so that pin valve 650 blocks conduit 682b.

The left end portion 390 of rod 197 has now moved leftwardly relative to the valve 395 so that the cam surface 393 forces the plunger 395a downwardly and the conduits 682a and 682b become confluent through the valve 395, and conduit 682b supplies oil pressure to pin valves 650 and 650a. The valve 395 will remain open for further shifts from second through 11th speeds. The left end portion 390 of rod 197 also moved leftwardly relative to pilot air valve 1230 and moves the piston rod 1235 and piston 1231 thereof upwardly, and such will remain upwardly until the shift into 11th speed or direct drive. The valve 1230 now vents the lower end of valve 1210 so that the piston 1211 in the latter moves downwardly, in which position the conduit 1200, leading from the vent 832a in the left end of valve 748, is no longer connected to the sump through conduit 1219 of valve 1210, but is now connected to conduit 737 containing lubrication oil at 30 p.s.i.

The above described charging of port 498 charges the top of actuator 534, and the latter attempts to shift the clutch means 72 leftwardly; however, until the gear clutch 138 is released or the throttle is dipped, the clutch means 72 is held engaged with the gear 52 by torque lock. The venting of port 500 vents the bottom of actuator 534, so that the air pressure that is now in the top of this actuator can, after the torque lock is relieved, move the actuator past neutral or its centralized position to its full downward or second speed position wherein clutch means 72 will move leftwardly into engagement with the gear 54.

The vented air pressure from the port 500 passes through the conduits 512 and 806 and forces the piston 810 to the left which carries plunger 776 of valve 748 therewith. The land 780 of plunger 776 moves to the left of the supply conduit 766, the land 782 covers the vent 817a, and the land 778 moves to the left of the vent 832a so that vent 832a, which is supplied with 30 p.s.i. oil pressure from conduit 1200, becomes confluent with conduit 828. At this time, oil pressure from supply conduit 766 continues to pass through conduits 790 and 790a, through the valve 750 and the conduit 804 to maintain the gear clutch 138 engaged and also through the conduit 804a to maintain the plunger 860 of 752 valve rightwardly. Additional oil pressure from the conduit 766 flows through the bore 774 between the lands 780 and 782 and through the conduit 816 into bore 820. From the bore 820, the oil pressure flows through the conduit 822, the enlarged portion 824, and into the conduit 826 to the direct drive clutch 136 to commence engaging the same.

As the clutch 136 commences engaging, that is, the pressure plate 1110 thereof commences moving to the right, the latter urges separator pins 1130 against the pressure plate 1120 of clutch 138 somewhat reducing the engagement of the latter. Simultaneously with the build up of oil pressure in the clutch 136, pressure builds up in the conduit 826, supplying this clutch, and in the enlarged portion 824 of bore 792 of valve 750 which biases the plunger 794 to the left; in which position land 798 blocks supply conduit (supplying oil pressure at 60 p.s.i.) from bore 792, and conduit 828 is connected to bore 792 in a confluent relationship with conduits 804 and 804a and supplies the same with 30 p.s.i. oil pressure.

At this time, the pressure in the groove 1124 of the clutch 138, which is constantly venting through the orifice 138a, drops to 30 p.s.i., the pressure of its supply, so that the 60 p.s.i. pressure in the groove 1114 of the clutch 136 forces the plate 1110 thereof to the right into substantial full engagement and the pins 1130 force the pressure plate 1120 of clutch 138 into its substantially disengaged position, while the 30 p.s.i. oil pressure in the groove 1124 acts upon the plurality of pistons 1150 which in turn act upon clutch 138 to maintain it in partial engagement. While the clutch 138 was coming to the partially disengaged condition, that is, as clutch 136 was becoming engaged, the torque lock between the clutch means 72 and the gear 52 reduces and the clutch means 72 moves to the left and the clutch teeth thereof abuttingly contact the clutch teeth of the second speed gear 54. Since the speed of the clutch means 72 and second speed gear 54 are not synchronized, the clutch means 72 does not enter engagement with the gear 54 at this time.

The piston 584 of the actuator 534 is now in a neutralized position and the various interlocks associated therewith, 634a and 636a, allow the piston 651a of pin valve 650a to move to the right and a neutral signal passes from the conduit 682b through the valve 650a, to the conduit 682c, the conduit 682d and into the right end of the bore 774 to maintain the plunger 776 to the left after the air pressure in the chamber 808 vents.

Simultaneously with the previously described supply of 30 p.s.i. oil to the conduit 804 and the clutch 138, oil at 30 p.s.i. was supplied to the conduit 804a and into the enlarged portion 868 of valve 752; this chamber having previously been supplied with 60 p.s.i. oil. At this time, the spring 864 moves the plunger 860 to the left against the 30 p.s.i. oil pressure, so that the land 862 covers the conduit 816 and blocks the flow of 60 p.s.i. oil therethrough; however, the land 860 moves left of the conduit 790 and 60 p.s.i. oil now enters the bore 820 from the conduit 790 and passes out of the same through the conduit 822 and onto the clutch 136.

With the clutches 136 and 138 substantially engaged and partially engaged, respectively, the speed of the gear 54 and the clutch means 72 rapidly synchronize, and the clutch means 72 moves to the left into engagement with the gear 54 when synchronization occurs. At this time, the piston 584 of actuator 534 moves downwardly to an engaged position from its neutralized position. The interlocks 634a and 636a associated with the actuator 534 now move the piston 651a of the pin valve 650a to the left, which terminates the neutral signal in the conduit 682d, and the oil pressure in the conduit 682d and the right end of bore 774 rapidly vent through the vent 682e. The plunger 776 is now moved to the right by the spring 784; which rightward movement initiates the reengagement of the gear clutch 138 and the disengagement of the direct drive clutch 136.

More particularly, rightward movement of the plunger 776 causes the land 782 to uncover the vent 817a; however, the clutch 136 is not vented at this instant because plunger 860 of the valve 752 is positioned to the left so that the land 862 blocks the conduit 816. The land 778 of plunger 776 blocks the conduit 832a, which was supplying 30 p.s.i. oil pressure to the conduit 828, and the land 780 moves to the right of the conduit 766 so that the latter now supplies 60 p.s.i. oil pressure to the conduit 828, and conduit 766 still supplies oil to the direct drive clutch through conduit 790. From conduit 828, this higher pressure flows into bore 792 of valve 750 and to the conduit 804 leading to the gear clutch 138 and the conduit 804a leading to the left end of valve 752. As the pressure in the clutch 138 builds up and the clutch commences full engagement, the pins 1130 press against the pressure plate 1110 of clutch 136 and reduce the engaging load thereof on the clutch 136.

Additionally, as the oil pressure builds up in the clutch 138, it also builds up in the conduits 804 and 804a and in the enlarged portion 868 and biases the plunger 860 to the right. The land 866 now blocks conduit 790 and terminates the flow of oil pressure to the direct drive clutch 136, while the land 862 moves to the right of the conduit 816, and the bore 820 vents through the latter, then into the bore 774 of valve 748 and out through the vent 817a. The bore 820, in turn, vents enlarged portion 824, the conduit 826 and the clutch 136 and, as the pressure reduces in the enlarged portion 824, the spring 802 biases plunger 794 to the right. The land 796 now closes the conduit 828 from the bore 792 of valve 750; however, the land 798 moves rightwardly of the conduit 790a, so that the bore 792 is supplied thereby and continues to supply the conduits 804 and 804a. The clutch 138 now becomes fully engaged and the clutch 136 becomes fully disengaged.

Second Speed to Third Speed

Placing the lever 238 of selector 194 in its third speed position vents the servocylinder 196 through the aperture 400 so that the piston means 350 moves to the left moving the selector valve 202 counterclockwise; the valve 200 is not moved during this shifting sequence. Movement of the valve 202 uncovers the port 486 so that the venting thereof is terminated and the port becomes charged with air pressure from chamber 449. This movement of valve 202 also covers port 488 and vents the latter to conduit 514. Port 488, in turn, vents conduit 546 leading to the top of actuator 528 and the piston rod 594 thereof attempts to move upwardly due to the pressure in the bottom of the actuator. However, interlock 632 and pin interlock 638 are being held leftwardly by piston 630 and the actuator 528, momentarily, is held in its neutral position.

The venting air pressure from port 488 then flows through conduits 514 and 806 to act upon the alternator valve and commence the operation of the clutches 136 and 138 as previously described for the shift from first to second.

Meanwhile, the port 486 passes pressure into the conduit 540 and then into the conduits 544 and 542, and from the latter conduits, respectively, into the inner ends of the pneumatic actuators 910 and 930, forcing the piston heads 914 and 934 and the plungers 110 and 111 carried thereby, outwardly so that the plungers 110 and 111 disengage from detents 112 on the ring gear 96. The ring gear 96 is now free to rotate.

The land 921 on piston rod 911 now uncovers oil pressure supply conduit 682 and the latter becomes confluent with the conduit 683. The land 982 of the piston rod 931 uncovers the conduit 683, while the land 941 covers the vent conduit 945, and the conduit 683 becomes confluent with the conduit 649. The conduit 649 supplies oil pressure into the housing for the piston 630, forcing the piston downwardly so that the latter allows the channel interlock 632, 634 and 636 to move to the right, and pin valve 650 opens to allow a neutral signal to pass from conduit 682b to conduit 682d and into the right end of the bore 774 of the valve 748 as previously described in the shift from first to second speed.

Piston rod 594 of actuator 528 is no longer held by the interlock 632 and commences to move upwardly; however, since the clutch means 78 which is moved thereby is not synchronized with the gear 62, the clutch teeth thereof at this time abut until such time as the operation of the clutches 136 and 138 synchronize the speeds thereof and the clutch means 78 moves into engagement with the gear 62. The operation of the primary side of the control system 192 during this shift from second to third is the same as that previously described during the shift from first to second speeds.

Upshifts From Third Speed Through 10th Speed

The operation of the primary side of the control system 192 remains the same as that described for the shift from first to second and second to third speeds. In these various shifts from third speed through 10th speed, the selector valve 194 actuates the linear actuator 196 to move to the left and actuate valve 200 or 202 to charge and vent the various actuators 528, 530, 532, 536 and 538 as described hereinbefore.

Shift Into 11th Speed or Direct Drive

To shift into 11th speed, the shift lever 238 is moved to its 11th speed position, which vents the servocylinder 196 through the aperture 416, and the piston means 350, including rod 197, moves to the left. The rod 197 moves the selector valve 202 counterclockwise to a position wherein the port 496, which was previously vented for 10th speed, is now uncovered and becomes charged with air pressure from chamber 449, and the port 497 becomes vented. The rod 197 also moved leftwardly relative to pilot air valve 1230 so that the notch 1236a becomes aligned with piston rod 1235 and the piston rod and the piston 1231, carried thereby, moves downwardly. The valve 1230 now charges the lower end of the valve 1210 moving the piston 1211 upwardly thereby disconnecting the conduit 1200 from the conduit 1201 leading to the lube conduit 737 and connects the conduit 1200 to the vent conduit 1219. The conduit 832a leading to the left end of bore 774 is now connected to a sump vent rather than to lube pressure as it was in upshifts from first speed to 10th speeds.

The now uncovered port 496 supplies air pressure through the conduit 554 to the top of the actuator 532 and the port 497 vents the bottom of the actuator 532 through the conduit 612. The piston rod 594 of actuator 532 will move downwardly, as soon as the torque lock between the clutch means 82 and the gear 70 is relieved, to its neutral position wherein the spacer 532a is abutted by the washer 596 and prevents further downward movement thereof.

The air pressure vented from the port 497 passes through the conduits 514 and 806 to move the piston 810 and the plunger 776 the left. The land 782 blocks the vent 817a, and land 780 moves left of the conduit 766 and the land 778 moves left of conduit 832a; the conduit 832a now being vented to sump pressure. From the conduit 766, pressure flows into bore 774 between land 780 and 782, then out of conduit 816 and into bore 820 of valve 752. From the latter bore, pressure flows from the conduit 822, then the enlarged portion 824, then through the conduit 826 and into the clutch 136 and commences to engage the clutch 136, while the pins 1130 relieve the load on the clutch 138, as previously described.

Pressure in the enlarged portion 824 moves the plunger 794 of valve 750 to the left, so that the conduit 828 becomes confluent with the conduits 804 and 804a through the bore 792. Since the conduit 828 is now connected to the sump through the conduit 832a of valve 748, the conduit 828 rapidly vents conduits 804 and 804a and, through the latter vents the gear clutch 138, completely disengages the same, and also vents the enlarged portion 868 at the left end of valve 752. The plunger 860 then moves to the left and the bore 820 thereof is now supplied with oil pressure directly from the conduit 790 between the lands 862 and 866, from where it continues to flow to the conduit 822.

As soon as the clutch 138 was disengaged sufficiently to commence slipping, the torque lock between the clutch means 82 and the gear 70 was relieved and the actuator 532 moved to its neutral position wherein it is held by the spacer 532a. The piston 651 of valve 650 is then moved rightwardly by the spring 652 which opens the valve 650 thereby connecting the conduits 682b and 682c and supplying a signal to the conduit 682d. From conduit 682d, the oil pressure is imposed on the right end of plunger 776 maintaining the same to the left.

Since the actuator 532 will now remain in its neutral position, the valve 650 will remain open, and the plunger 776 of the alternator valve 748 will remain to the left, keeping the direct drive clutch 136 engaged and the gear clutch 138 disengaged so that the transmission is in direct drive.

Downshift from 11th Speed to 10th Speed

The shift lever 238 is moved to 10th speed position which vents servocylinder 196 through aperture 414. The lower pressure on the right side of piston means 350 causes the plunger 754a of the upshift-downshift valve 754 to move to the right and also moves the piston means 350 to the right to its 10th speed position. The rod 197, in moving to the right, moves the notch 1236a away from the piston rod 1235 of valve 1230 thereby moving piston rod 1235 upwardly so that the lower end of the valve 1210 is vented. The conduit 1200 is now connected to the conduit 1201 leading to the lube conduit 737, so that the conduit 1200 supplies lube pressure to the conduit 832a at left end of the alternator valve 748.

Meanwhile, the double rack gear portion of the rod 197 moved the selector valve 202 clockwise so that the port 496 becomes vented and the port 497 becomes charged. The port 496 vents the top of actuator 532, while the port 497 charges the bottom thereof, so that the actuator 532 attempts to move upwardly to its 10th speed position; however, since the clutch means 82 and the gear means 70 are not synchronized, the same merely abut at this time and a neutral signal is still given by the pin valve 650 thereby keeping vale 748 leftwardly. The vented air pressure from port 496, while it passes through conduits 514 and 806 and into chamber 808, accomplishes no purpose, since the valve 748 was already in its leftward position.

The 30 p.s.i. oil pressure from the conduit 832a flows through the conduit 828, and into the bore 792 of valve 750 between the lands 796 and 798 of plunger 794, which, at this instant, is still positioned to the left, and from the bore 792 enters the conduits 804 and 804a. The 30 p.s.i. oil from the conduit 804a is not sufficient, upon entry into enlarged portion 868, to bias plunger 860 to the right as previously described, however, the 30 p.s.i. oil pressure in the conduit 804 commences engagement of the clutch 138 and also flows through the conduit 836, then through the upshift-downshift valve 754, through the conduit 836a and into the left end of the bore 792 of valve 750. This moves the plunger 794 to the right so that the land 796 covers the conduit 828, while the conduit 790a immediately becomes confluent with the bore 792 between the lands 796 and 798 and supplies both the conduits 804 and 804a.

The pressure from the conduit 804a moves the plunger 860 to the right, wherein the land 862 unblocks conduit 816, conditioning the valve 752 to vent the direct drive clutch 136, while the land 866 blocks the conduit 790; however, since the plunger 776 of the valve 748 is still left, oil pressure is still supplied to the bore 820 of valve 752 and from the latter to the clutch 136.

The pressure from the conduit 804 enters clutch 138 wherein 60 p.s.i. pressure is applied to the pressure plate 1120 and the pistons 1150. The pressure plate 1120 of clutch 138 and the pressure plate 1110 of clutch 136 are now both supplied with 60 p.s.i. pressure and both these pressure plates, through pins 1130 move to a partially disengaged position. Pistons 1150, however, with 60 p.s.i. pressure thereon, urge the clutch 138 into substantial frictional engagement, while clutch 136 can easily slip.

As described earlier herein, the operator keeps the accelerator depressed during shifting, and with the clutch 136 slipping, the engine speed increases and, with the gear clutch 138 substantially engaged, the shaft 14 is speeded up, thereby increasing the speed of the gear 70 toward that of the clutch means 82, and at synchronization, actuator 532 moves to its upward position and shifts the clutch means 82 into engagement with the gear 70.

Upon the actuator 532 moving upward, the piston 651 of valve 650 is moved leftwardly thereby terminating the neutral signal in conduit 682d to the right end of valve 748, and the plunger 776 moves to its rightward position. The land 782 uncovers the vent 817a, which quickly vents the bore 820 of valve 752 which in turn vents the direct drive clutch 136. With no oil pressure on the pressure plate 1110, the pressure plate 1120 of the clutch 138 moves to completely engage the gear clutch, and the downshift to 10th speed is completed.

Downshift from 10th Speed to Ninth Speed the shift lever 238 is moved to ninth speed position venting the servocylinder 196 through the aperture 412 causing the piston means 350 to move to the right to its ninth speed position, with upshift-downshift valve 754 remaining rightwardly. The piston means 350 moves the rod 197 to the right which moves the selector valve 202 clockwise so that the port 496 becomes charged and the port 494 becomes vented. The port 496 charges the top of the actuator 532, so that the same attempts to move downwardly to move the clutch means 82 to the left and out of engagement with the gear 70, however, torque lock maintains such engagement at this time. The venting port 494, in turn, vents the bottom of the actuator 530, through the conduit 552, so that this actuator attempts to move the clutch means 80 to the left and into engagement with the gear 68; however, since the gear 68 and the clutch means 80 are not synchronized at this time, such merely abut and the actuator 530, while attempting to move downwardly, remains neutralized.

The air pressure vented from the port 494 passes through the conduits 514 and 806 to force the piston 810 and the plunger 776 to the left. The land 782 of the plunger 776 covers the vent 817a, while the land 780 moves to the left of the conduit 766. The conduit 766 still passes oil pressure to the bore 792 through the conduits 790 and 790a, and now passes oil pressure to the bore 820 of valve 752 through the conduit 816. from the bore 820, oil pressure passes through the conduit 822, the enlarged portion 824 and the conduit 826 to the groove 1114 of the clutch 136 wherein it forces the pressure plate 1110 to the right.

The pressure in the enlarged portion 824 is not able to force the plunger 794 of valve 750 to the left because oil pressure is entering the left end of the valve 750 from the upshift-downshift valve 754. Accordingly, at this time both the clutches 136 and 138 are supplied with 60 p.s.i. oil pressure and the pins 1130 cause both the pressure plates 1110 and 1120 to be partially engaged; however, the pistons 1150 maintain substantial engagement of the clutch 138. This condition of the clutch 138 breaks the torque lock between the clutch means 82 and gear 70 sufficiently so that the actuator 532 moves the clutch means 62 to its neutral condition, whereupon the pin valve 650 allows a neutral signal to flow from the conduit 682b to the conduit 682d and into the right end of the valve 748 to keep the plunger 776 of the alternator valve 748 to the left after the air pressure in chamber 810 becomes vented.

The neutral signal from pin valve 650 is not essential for downshifting operations, for the alternator valve 748 need only be to the left for a period sufficient for the direct drive clutch 136 to be engaged and force pins 1130 against pressure plate 1120 to break the torque lock. The gear clutch 138 is all that is necessary for synchronizing after the previous gear is neutralized.

When the clutch means 82 becomes neutralized, and with the clutch 138 substantially engaged, the vehicle engine can speed up to synchronize the gear 68 and the clutch means 80 through the gear clutch 138, and at synchronization, the actuator 530 moves downwardly and shifts the clutch means 80 to the left into engagement with the gear 68. This moves the piston 651 of pin valve 650 to the left and terminates the neutral signal in the conduit 682d so that the plunger 776 of valve 748 moves to the right. The land 780 moves to the right of the conduit 766 terminating the supply of oil pressure to the conduit 816 and the valve 752, and the land 782 moves to the right of the vent 817a so that the latter vents the valve 752 and the direct drive clutch 136. The clutch 138 then becomes fully engaged and the shift to ninth speed is completed.

All Downshifts from Ninth Speed to Third Speed

In the downshifts from ninth speed to third, the operation of the primary control system 192 remains the same as described for the downshift from 10th speed to ninth speed, with the selector valve 196 being positioned as required and the servocylinder 196 causing the actuators 528, 530, 534, 536 and 538 to be operated as required, so that no further explanation is deemed necessary.

Downshift From Third to Second

In the downshift from third to second, the piston means 350 and the rod 197 move to the right and rotate the selector valve 202 clockwise which charges the port 488 and vents the port 486. The air pressure vented from the port 486 activates the primary portion 192 of the control system and the same operates as in the previously described downshifts.

Charging of the port 488 provides air pressure to the top of actuator 528 wherein it attempts to move downwardly to its neutral position to move the clutch means 78 out of engagement with the gear 62 and become positioned between gears 62 and 64. When the primary portion 192 of the control system causes the clutch 136 to engage, thereby partially disengaging the clutch 138, and the actuator 528 moves the clutch means 78 to its neutral position, whereupon the interlocks 634 and 636 allow the pin valve 650 to open and give a neutral signal to the alternator valve 748.

The above mentioned venting of the port 486 vented the conduits 540, 542 and 544 and through the same the inner ends of the pistons 910 and 930 were vented. The pistons 911 and 931, carrying the plungers 110 and 111, respectively, attempted to move inwardly; however, since the ring gear 96 is rotating, the plungers 110 and 111 cannot, momentarily, enter the detents 112 at this time and the plungers merely abutted the periphery of the ring gear. When the clutch means 78 was neutralized, the accelerating vehicle engine, through gear clutch 138, increased the speed of shaft 16, and through the same the speed of the sun gears 90 and with the shaft 18 neutralized upon the disengagement of clutch means 78, the ring gear 96 slows down, and the plungers 110 and 111 can move inwardly and enter the detent on the ring gear 96.

When the plungers 110 and 111 move inwardly, the pistons 911 and 931 move inwardly whereby the supply of hydraulic fluid from the conduit 683 to 649 is blocked by the land 942 of piston 931, while the land 941 unblocks the vent 945, and the conduit 649 is vented through the conduit 945. Venting of the conduit 649 allows the interlock piston 630 to be biased upwardly by spring 646 which biases the interlocks 632, 634, 636 and 638 to the left, which moves the piston 651 to the left closing the valve 650 thereby terminating the neutral signal to the alternator valve 748. The alternator valve 748 then moves to the right causing complete disengagement of the clutch 136 and full engagement of the gear clutch 138.

Downshift From Second Speed to First Speed

The shift lever 238 is moved to its first speed position resulting in the piston means 350 and the rod 197 moving to the right to their first speed position to thereby rotate selector valve 200 counterclockwise to charge the port 500 and vent the port 498. Charging of the port 500 pressurizes the bottom of the actuator 534 attempting to urge the same to move upwardly to move the clutch means 72 to the right and out of engagement with gear 54. Venting of the port 498 vents the top of actuator 534 so that same attempts to move to its full up position to move the clutch means 72 past its neutral position and into engagement with the gear 52.

The rod 197, in its present first speed position, allows the valve 395 to close which terminates the supply of oil pressure to the pin valves 650 and 650a so that no neutral signal will be supplied when the actuator 534 has reached its neutral position. Valve 395 remains closed in first speed, neutral and reverse. However, venting of the port 498 supplies air pressure through the conduits 512 and 806 to the alternator valve 748 to move the plunger 776 to the left and the valve 748 remains left (during such time as chamber 808 is venting) sufficiently long for the pressure plate 1110 of clutch 136 to be moved toward engagement and, through the pins 1130, partially disengage the clutch 138 sufficiently to break the torque lock between the clutch means 72 and gear 54. The actuator 534 then moves the clutch means 72 to the right wherein it abuts the gear 52 until the speeds thereof are synchronized by the engine accelerating the shaft 14 through the gear clutch 138 and the shaft 14 accelerating the gears 32 and 52. At synchronization, the actuator 534 moves the clutch means 72 into complete engagement with the gear 52. By the time this has occurred, the air pressure in the chamber 808, from the vented port 498, has vented and the plunger 776 of alternator valve has returned to the right causing the clutch 136 to be fully disengaged and the gear clutch 138 to be fully engaged.

Downshift From First Speed to Neutral

Shift lever 238 is moved to its neutral position resulting in piston means 350 and rod 197 moving to the right of their first speed position to thereby rotate selector vale 200 counterclockwise to a position between ports 498 and 508. No port is vented and, therefore, no signal given to the alternator valve 748. However, the vehicle operator in this shift accomplishes disengagement of both clutches 136 and 138 by depressing the clutch pedal 695a.

The previously vented port 498 is now charged with air pressure thereby charging the top of the actuator 534 so that the same will move downwardly to its central position moving the clutch means 72 to its neutral position. Upon release of the clutch pedal, the gear clutch 138 will be engaged, however, since the shaft 16 is now neutralized, the transmission cannot drive the vehicle.

Shift From Neutral to Reverse

With the vehicle stationary, the operator utilizes the clutch pedal 695a to disengage both of the clutches 136 and 138 and moves the shift lever 238 to its reverse position resulting in the piston means 350 and the rod 197 moving to the right to their reverse position to thereby rotate the selector valve 200 counterclockwise to a position wherein the port 508 is vented. This causes an actuator (not shown) to move the clutch means 104 into engagement with the gear 102 and the transmission is in reverse drive. The operator then releases the clutch pedal to cause engagement of gear clutch 138 whereby the vehicle can be driven in reverse.

It should be clear from the foregoing description that a transmission, including a control system therefor, has been described which completely fulfills the objects of the invention and has all the attendant advantages thereof. However, it is understood that the specific construction described is only exemplary and many modifications may be made thereto without departing from the scope of the invention.

What I claim is:

1. A transmission comprising; input means and output means for said transmission, integrating gear means having an output portion and a first and a second input portion with said output portion drivingly connected to said output means, first and second driving means for drivingly connecting said input means to said first and second input portion respectively, each of said driving means including a plurality of alternately selectable reduction ratio drive means, and selectively operable means for drivingly connecting said input means to said output means in a direct drive relationship.

2. A transmission according to claim 1 wherein said integrating gear means provides a reduction ratio drive between said driving means and said output means.

3. A transmission according to claim 1 including selectively operable means for retaining said input portion of said integrating gear means stationary whereby said second driving means drives said second input portion of said integrating gear means and the latter drives said output means with said first input portion of said integrating gear means serving as a stationary reaction means.

4. A transmission according to claim 1 wherein said first and second driving means includes a first and second shaft means drivingly connected to said first and second input portions respectively, and first and second gear means for drivingly connecting said input means to said first and second shaft means, said first gear means including at least a pair of ratio gear means and first gear clutch means for connecting a selected one of said ratio gear means in a driving relationship between said input means and said first intermediate driving means, said second gear means including at least a second pair of ratio gear means and second gear clutch means for connecting a selected one of said second ratio gear means in a driving relationship between said input means and said second shaft means, and said selectively operable means includes a clutch means.

5. A transmission according to claim 4 wherein said integrating gear means provides a reduction ratio drive between said first and second shaft means and said output means.

6. A transmission according to claim 5 wherein said integrating gear means is a planetary gear set including a ring gear, a sun gear, planet gears and a planet gear carrier, with said firs shaft means being drivingly connected to said ring gear, said second shaft means being drivingly connected to said sun gear, and said planet gears and planet gear carrier comprising said output portion.

7. A transmission according to claim 4 wherein said input means includes an input element, an input shaft and selectively operable clutch means for connecting said element to said shaft, said first and second shaft means are countershafts extending parallel to and radially spaced from said input shaft, said first and second gear means includes a plurality of input gears disposed along the length of the input shaft and unitarily rotatable therewith and also includes a set of a plurality of free running gears meshed with and driven by each input shaft gear, each of said free running gears of each set being rotatably mounted on a differential one of said countershafts, and said gear clutch means being operative to selectively connect and disconnect each of said free running gears to the countershaft on which it is mounted, and said selectively operable means is operative to connect said output means to said input element.

8. A transmission according to claim 7 wherein said input shaft is a hollow elongated shaft, and said selectively operable means includes a through shaft and a friction clutch, said friction clutch is selectively engageable and disengageable for selectively connecting and disconnecting said through shaft to said input element, and said through shaft is disposed rotatably within said input shaft and coaxial therewith.

9. A variable speed transmission comprising; an elongated input shaft having a plurality of input gears disposed along the length thereof and unitarily rotatable therewith, a plurality of countershafts extending parallel to and spaced from said input shaft, a set of a plurality of free running gears meshed with and driven by each input shaft gear, each of said free running gears of each set being rotatably mounted on a different one of said plurality of countershafts, means for selectively connecting and disconnecting each of said free running gears to the countershaft on which it is mounted, and integrating gearing means connected to receive power from said plurality of countershafts and provide a collected common output.

10. A variable speed transmission according to claim 9 wherein said integrating gearing means includes an output portion and a first and a second input portion, one of said countershafts being connected to said first input portion and another of said countershafts being connected to said second input portion, and selectively operable means for retaining said first input portion stationary at such time as the selectively connecting and disconnecting means for the free running gears on the countershaft connected to said first input portion have disconnected said free running gears from such countershaft.

11. A transmission according to claim 9 including a reverse shaft disposed parallel to said countershafts, and reverse gearing carried by said reverse shaft and drivingly connected to one of said free running gears and to said integrating gearing means.

12. A transmission according to claim 9 including input means for driving said input shaft, an output means driven by the common collected output from said integrated gearing means, and selectively operable means for drivingly connecting said input means to said output means in a direct drive relationship.

13. A transmission according to claim 12 wherein said selectively operable means includes a clutch means, and said transmission includes a control system for fully actuating said clutch means at such time as the means for selectively connecting and disconnecting said free running gears has disconnected all the free running gears on at least one of said countershafts.

14. A variable speed transmission according to claim 12 wherein said integrating gearing means includes an output portion and a first and a second input portion, said output portion being connected to said output means, a first of said countershafts being connected to said first input portion and a second of said countershafts being connected to said second input portion, and selectively operable means for retaining said first input portion stationary at such time as the selectively connecting and disconnecting means for the free running gears on said first countershaft have disconnected the free running gears from said first countershaft.

15. A variable speed transmission comprising; an input member and an output member, a pair of power paths each having an input and an output end and each including a plurality of ratio drives and selecting means for selecting any one of said ratio drives and for neutralizing all of said ratio drives, a planetary gear set having at least a first, a second and a third portion, one end of one of said power paths being connected to said first portion and one end of the other of said power paths being connected to said second portion, and said third portion being connected to one of said members, clutch means for connecting the other of said members in a driving relationship with the other end of said pair of power paths, and selectively operable means for directly drivingly connecting said input member to said output member.

16. A transmission according to claim 15 wherein said clutch means is a first clutch means, said selectively operable means is a second clutch means and both said clutch means are disposed in a common housing.

17. A transmission according to claim 15 including reverse gear means, and means for connecting said reverse gear means in a driving relationship between said one end of said one power path and said first portion of said planetary gear set at such times as said selecting means of said one power path has neutralized all of said ratio drives of said one power path.

18. A transmission according to claim 15 wherein the ratio drives of said power paths are gear drives and include a plurality of sets of gears, and at least some of the gears of the ratio drives of both of said power paths are shared by both of said power paths.

19. A variable speed transmission comprising; an input member and na output member, an elongated shaft having a plurality of first gears disposed along the length thereof and unitarily rotatable therewith, a plurality of countershafts extending parallel to and spaced from said elongated shaft, a set of a plurality of free running gears meshed with and driven by each of said first gears, each of said free running gears of each set being rotatably mounted on a different one of said plurality of countershafts, connectable means for selectively connecting and disconnecting each of said free running gears to the countershaft on which it is mounted, a planetary gearset having at least a first, a second and a third portion, one end of one of said countershafts being drivingly connected to said first portion, one end of a second of said countershafts being connected to said second portion and said third portion being connected to one of said members, selectively operable clutch means for connecting the other of said members in a driving relationship with said elongated shaft, and selectively operable means for selectively drivingly connecting said input member to said output member.

20. A transmission according to claim 19 including reverse gear means, said reverse gear means including at least a reverse gear drivingly engaged with one of said free running gears.

21. A variable speed transmission according to claim 20 wherein said reverse gear means also includes a reverse shaft carrying said reverse gear and gear means connecting said reverse shaft in a driving relationship with one of the portions of said planetary gear set.

22. A transmission according to claim 19 wherein said connectable means includes a plurality of gear clutch means, with one of said gear clutch means being associated with each of said free running gears and being carried by the countershaft on which such gear is mounted and being operable to selectively drivingly connect and disconnect said gear to said countershaft.

23. A transmission comprising an input member, an input shaft and input gears carried thereby, a pair of countershafts and countershaft gears carried thereby, said countershaft gears meshing with said input gears, and a plurality of selectively operable gear clutch means for connecting and disconnecting selected of said meshing gears in a driving relationship between said shafts, an output member, gear means connecting said countershaft to said output member, direct drive clutch means for directly connecting said input and output members, input friction clutch means for connecting said input member to said input shaft, and control means for operating said clutch means including means for causing at least partial simultaneous engagement of both said friction clutch means during upshifting.

24. A transmission according to claim 12 wherein said control means includes means for operating said gear clutch means to disconnect the driving relationship of said meshing gears between at least one of said countershafts and said input shaft and for engaging said direct drive clutch means and disengaging said input clutch means for placing said transmission in a direct drive condition.

25. A change speed transmission comprising in combination; an input means, an output means adapted to be driven from said input means, a first and a second power path connected between said input and output means, with each power path including a plurality of change speed driving means selectively connectable between said input and output means for providing a selected one of a plurality of reduced radio driving connections therebetween, means for selectively engaging and disengaging said driving means in a driving relationship between said input and output means and including portions drivingly connected to said input means and portions drivingly connected to said output means, and a single synchronizing means operable on upshifting to any selected one of said change speed driving means for coupling said input and output means and reducing the speed of a portion of the engaging means connected to said input means to the speed of a portion of said engaging means connected to said output means so that said portions of said engaging means are synchronized and can be engaged to connect said selected driving means in a driving relationship between said input and output means.

26. A transmission according to claim 25 wherein each said power path has a separate selectively engaging and disengaging means and said single synchronizing means comprises a rapid and progressively operating coupling device having a pair of portions one of which a drivingly connected to said input means and one of which is drivingly connected to said output means and includes controlable means for effecting the coupling and uncoupling of said portions in a driving relationship, said controlling means being operative to effect the coupling of said portions to thereby connect said input and output means in a direct drive relationship when said engaging means of either power path has disengaged the change speed gears of such power path for reducing the speed of said input means and the various elements drivingly connected thereto during upshifting, and for connecting said input shaft and said output shaft when direct drive is desired.

UNITED STATES PATENT OFFICE
CERTIFICATE OF CORRECTION

Patent No. 3,589,483        Dated June 29, 1971

Inventor(s) Paul J. Smith

It is certified that error appears in the above-identified patent and that said Letters Patent are hereby corrected as shown below:

Column 36, claim 6, line 28, "firs" should be "first";

Column 37, claim 19, line 65, "na" should be "an";

Column 38, claim 24, line 40, "12" should be "23";
           claim 25, line 54, "radio" should be "ratio";
           claim 26, line 72, "a" should be "is".

Signed and sealed this 30th day of November 1971.

(SEAL)
Attest:

EDWARD M. FLETCHER, JR.          ROBERT GOTTSCHALK
Attesting Officer                Acting Commissioner of Patents